(12) United States Patent
Stoddart et al.

(10) Patent No.: US 7,220,818 B2
(45) Date of Patent: May 22, 2007

(54) NONCOVALENT FUNCTIONALIZATION OF NANOTUBES

(75) Inventors: J. Fraser Stoddart, Los Angeles, CA (US); Alexander Star, Pittsburgh, PA (US); Yi Liu, San Diego, CA (US); Ludek Ridvan, Prague (CZ)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 10/919,659

(22) Filed: Aug. 16, 2004

(65) Prior Publication Data

US 2005/0043503 A1 Feb. 24, 2005

Related U.S. Application Data

(60) Provisional application No. 60/496,946, filed on Aug. 20, 2003.

(51) Int. Cl.
*C08G 75/00* (2006.01)
(52) U.S. Cl. .................. 528/377; 528/86; 429/212; 429/213; 429/209
(58) Field of Classification Search ............... 528/377, 528/86; 429/212, 213, 209
See application file for complete search history.

(56) References Cited

OTHER PUBLICATIONS

Satr et al, Noncovalent side wall functionalization of single-walled carbon nanotubes, Macromolecules, 36(3), 553-560 (English) 2003, Chem Abstract 138: 205424.*

A.B. Dalton et al., "slective Interaction of a Semiconjugated Organic Polymer with Single-Wall Nanotubes, " J. Phys. Chem. B 2000, 104, pp. 10012-10016.

Jian Chen et al., "Noncovalent Engineering of Carbon Nanotube Surfaces by Rigid, Functional Conjugated Polymers, " J. Am. Chem. Soc. 2002, 124, pp. 9034-9035.

Jonathan N. Coleman et al., "Phase separation of Carbon Nanotubes and Turbostratic Graphite Using a Functional Organic Polymer," Advanced Materials 2000, 12, no. 3, pp. 213-216.

S. Curran et al., "Evolution and Evaluation of the Polymer/Nanotube Composite," Synthetic Metals, 103 (1999), pp. 2559-2562.

David W. Steuerman et al., "Interactions between Conjugated Polymers and Single-Walled Carbon Nanotubes," J. Phys. Chem. B 2002, 106, pp. 3124-3130.

Alexander Star et al., "Preparation and Properties of Polymer-Wrapped Single -Walled Carbon NAnotubes," Angew. Chem. Int. Ed. 2001, 40, No. 9, pp. 1721-1725.

S. A. Curran et al., "A composite from Poly(*m*-phenylenevinyiene-co-2,5-diotoxy-*p*-phenylenevinylene) and Carbon Nanotubes: A Novel Material for Molecular Optoelectronics," Adv. Mater. 1998, 10, No. 14, pp. 1091-1093.

B. McCarthy et al., Microscopy studies of nanotube-conjugated polymer interactions, Synthetic Metals 121 (2001) pp. 1091-1093.

Ajayan, P. M., nanotubes from Carbon, Chem. Rev. 1999,99, 1787-1799.

(Continued)

*Primary Examiner*—Duc Truong
(74) *Attorney, Agent, or Firm*—Venable LLP; Michael A. Gollin

(57) ABSTRACT

Nanotubes are treated with poly{(5-alkoxy-m-phenylenevinylene)-co-[(2,5-dioctyloxy-p-phenylene)vinylene]} (PAmPV) polymers and derivatives thereof to provide noncovalent functionalization of the nanotubes which increases solubility and enhances other properties.

14 Claims, 7 Drawing Sheets

OTHER PUBLICATIONS

Bahr, J. L. et al., Functionalization of Carbon Nanotubes by Electrochemical Reduction of Aryl Diazonium Salts: A Bucky Paper Electrode, *J. Am. Chem. Soc.* 2001,123,6536-6542.

Holzinger, M. et al., Sidewall Functionalization of Carbon Nanotubes, *Angew. Chem., Int. Ed.* 2001, 40, 4002-4005.

Georgakilas, V., et al., Organic Functionalization of Carbon Nanotubes, *J. Am. Chem.* Soc. 2002, 124, 760-761.

Amabilino, D. B.; Stoddart, J. F., Interlocked and Intertwined Structures and Superstructures, *Chem. Rev.* 1995, 95, 2725-2828.

Provent, C. et al., Double Wittig Reactions with 4-Carboxybutylidene Triphenylphosphorane as the Key Step in the Synthesis of Benzene Derivatives Metadisubstituted with ww-Difunctionalized Six-Carbon Chains, *Tetrahedron Lett.* 1996, 37, 1393-1396.

Santaniello, E.; Ferraboschi, P., Efficient and Selective Oxidation of Alcohols by Potassium Dichromate Solutions, *Synthesis* 1980, 646-647.

Süsse, M.; Johne, S.; Hesse, M., *Helv. Chim. Acta* 1992, 75, 457-470.

Davey, A.P. et al., Synthesis and Optical Properties of Phenylene-vinylene Copolymers, Synth. Met. 1999, 103, 2478-2479.

Cantrill, S. J. et al., A molecular meccano kit, J. Chem. Soc., Dalton Trans. 2000,3715-3734.

Asakawa, M. et al., Improved Template-Directed Synthesis of Cyclobis(paraquat-*p*-phenylene), J. Org. Chem. 1996, 61, 9591-9595.

Ashton, P. R. et al., Supramolecular Daisy Chains, Angew. Chem xter, I., Cantrill, S. Int. Ed. 1998, 3 7, 1294-1297.

Brown, C. L. et al., The Mechanisms of Making Molecules to Order, Israel J. Chem. 1992, 32, 61-67.

Ashton, P. R et al.,. Molecular Meccano, J. Am. Chem. Soc. 1995, 117, 11171-11197.

Ashton, P. R. et al., Simple Mechanical Molecular and Supramolecular Machines: Photochemical and Electrochemical Control of Switching Processes, Chem. Eur. J. 1997,3, 152-170.

Ajayan et al, Applications of Carbon Nanotubes, Topics Appl Phys.80, pp. 391-425.

Hirsch, A., Functionalization of Single-Walled Carbon Nanotubes, Angew. Chem. Int. Ed. 2002 *41* No. 11, pp.1853-1859, 2002.

* cited by examiner

NONCOVALENT FUNCTIONALIZATION OF NANOTUBES

This invention was made with Government support of Grant No. 0073046, awarded by the NSF and Grant No. N00014-00-1-0216, awarded by ONR. The Government has certain rights in this invention.

BACKGROUND OF THE INVENTION

1. Field of the Invention

The present invention relates generally to the functionalization of nanotubes in order to enhance various properties of the nanotubes including solubility in solvents. More particularly, the present invention is directed to the noncovalent functionalization of nanotubes by treating them with certain types of polymers that wrap around the nanotubes.

2. Description of Related Art

The publications and other reference materials referred to herein to describe the background of the invention and to provide additional detail regarding its practice are hereby incorporated by reference. For convenience, the reference materials are numerically referenced and grouped in the appended bibliography.

The small dimensions and remarkable physical properties of single-walled carbon nanotubes (SWNTs) render them unique materials with a wide range of potential applications.[1] However, their lack of solubility in solvents presents a considerable impediment toward harnessing their applications.[2] Although the covalent functionalization of the sidewalls of SWNTs leads to soluble samples and opens up the possibility of attaching other molecules to nanotubes,[3,4] all the covalent chemical approaches disrupt the extended $\pi$-networks on their surfaces, diminishing both their mechanical and electronic properties. On the other hand, a noncovalent supramolecular approach which involves polymer wrapping[5-8] of the nanotubes preserves their unique properties.

The creation of polymer-nanotube composites holds out much promise, both for reinforcing the polymers and extending their applications in electronic device settings. Recently, such a scenario has been demonstrated[5] in the case of the conjugated luminescent polymer, poly{(m-phenylenevinylene)-co-[(2,5-dioctyloxy-p-phenylene)vinylene]} (PmPV), filled with either SWNTs or multi-walled carbon nanotubes. Compared with the pristine polymer, these nanotube/PmPV composites have exhibited large increases (by nearly eight orders of magnitude) in electrical conductivity with little loss in photoluminescence and electroluminescence yields. Moreover, the composite is far more robust than the polymer on its own when it comes to mechanical strength and photo-bleaching properties. The coiled morphologies of the polymer chains help them wrap themselves around the nanotubes when they are suspended in dilute solutions of the polymer.

We have also reported[7] on the use of PmPV for wrapping around SWNTs. Complexes (SWNT/PmPV) are formed on account of stabilizing noncovalent bonding interactions, presumably as a result of $\pi$—$\pi$ stacking and van der Waals interactions between PmPV and the surfaces of the SWNTs. The nature of the interaction of PmPV, as well as that of poly{(2,6-pyridinylenevinylene)-co-[(2,5-dioctyloxy-p-phenylene)vinylene]} (PPyPV) 1), with SWNTs has been investigated and compared.[8] Optoelectronic devices have also been fabricated with these complexes. It is clear that noncovalent functionalization of carbon nanotubes can be achieved without disrupting the primary structure of the nanotubes themselves. To this extent, noncovalent functionalization has potentially a virtue that all forms of covalent functionalization lack.

SUMMARY OF THE INVENTION

In accordance with the present invention, poly[(m-phenylenevinylene)-co-(p-phenylenevinylene)]s are provided which are functionalized in the synthetically accessible C-5 position of the meta-disubstituted phenylene rings have been designed and synthesized, The compounds are essentially poly{(5-alkoxy-m-phenylenevinylene)-co-[(2,5-dioctyloxy-p-phenylene)vinylene]} (PAmPV) derivatives. A range of these PAmPV polymers have been prepared both (1) by the polymerization of O-substituted 5-hydroxyisophthaldehydes and (2) by chemical modifications carried out on polymers bearing reactive groups at the C-5 positions. PAmPV Polymers solubilize SWNT bundles in organic solvents by wrapping themselves around the nanotube bundles. PAmPV Derivatives which bear tethers or rings form pseudorotaxanes with rings and threads, respectively. The formation of the polypseudorotaxanes has been investigated in solution by NMR and UV/Vis spectroscopies, as well as on silicon oxide wafers in the presence of SWNTs by AFM and surface potential microscopy. Wrapping of these functionalized PAmPV polymers around SWNTs results in the grafting of pseudorotaxanes along the walls of the nanotubes in a periodic fashion. The results hold out the prospect of being able to construct arrays of molecular switches and actuators.

The present invention is based on the synthesis and characterization of a variety of polymers functionalized in the synthetically accessible C-5 position on the meta-disubstituted phenylene ring, affording poly{(5-alkoxy-m-phenylenevinylene)-co-[(2,5-dioctyloxy-p-phenylene)vinylene]} (PAmPV) derivatives. The new polymers were all examined for their interactions with SWNTs. They provide a ready means to change the physical properties of nanotubes, such as their solubilities, as well as the possibility of functionalizing them. PAmPV derivatives, bearing tethers or rings that form pseudorotaxanes with matching rings or threads represent two different types of polypseudorotaxanes.[9] The present invention also involves the synthesis of self-assembling pseudorotaxane-containing PAmPV polymers based on the two different recognition motifs—(i) one involving hydrogen-bonding interactions between secondary dialkylammonium centers (e.g., dibenzylammonium ions) and suitable crown ethers (e.g., benzo[24]crown-8), and (ii) the other involving $\pi$—$\pi$ stacking, [C—H..O], and [C—H..$\pi$] interactions between $\pi$-electron-deficient hosts (e.g., cyclobis(paraquat-p-phenylene) and $\pi$-electron rich guests (e.g., 1,5-bishydroxyethoxyethoxy-naphthalene). Wrapping these functionalized polymers around SWNTs results, in essence, in the grafting of pseudorotaxanes along the walls of SWNTs in a periodic fashion.

Functionalized polymers that may be used to treat nanotubes in accordance with the present invention have the following formula:

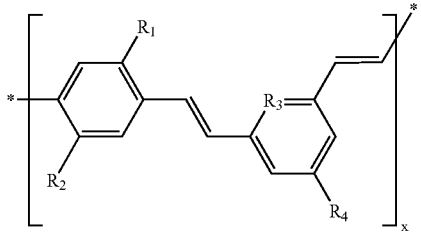

Wherein x is from 5 to 100; $R_1$ is a linear or branched alkyl group having from 1 to 19 carbon atoms or a linear or branched alkoxy group having from 1 to 19 carbons atoms; $R_2$ is a linear or branched alkyl group having from 1 to 19 carbon atoms or a linear or branched alkoxy group having from 1 to 19 carbon atoms wherein $R_1$ and $R_2$ may be the same or different; $R_3$ is CH or N; and $R_4$ is $O(CH_2)y$-FG where y=0 to 20 and FG is a functional group, such as H, F, Cl, Br, OH, SH, $NH_2$, $CO_2H$, amino acids, sugars, DNA fragments, steroids, $CO_2R'$ and CONHR" where R' and R" are alkyl groups. The functionalized polymers may be combined with nanotubes to provide noncovalent sidewalled functionalized nanotubes that are soluble in solvents and have other desirable properties.

The above described and many other features and attendant advantages of the present invention will become better understood by reference to the detailed description when taken in conjunction with the accompanying drawings.

DETAILED DESCRIPTION OF THE INVENTION

The polymers that may be used to functionalize or otherwise treat nanotubes in accordance with the present invention have the formula:

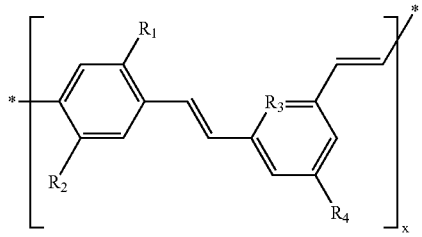

Wherein x is from 5 to 100; $R_1$ is a linear or branched alkyl group having from 1 to 19 carbon atoms or a linear or branched alkoxy group having from 1 to 19 carbon atoms; $R_2$ is a linear or branched alkyl group having from 1 to 19 carbon atoms or a linear or branched alkoxy group having from 1 to 19 carbon atoms wherein $R_1$ and $R_2$ may be the same or different; $R_3$ is CH or N; and $R_4$ is $O(CH_2)y$-FG where y=0 to 20 and FG is a functional group, such as H, F, Cl, Br, OH, SH, $NH_2$, $CO_2H$, amino acids, sugars, DNA fragments, steroids, $CO_2R'$, CONHR" (R' and R" are alkyl groups) and the like. Polymers having the above formula are referred to herein as PamPV polymers and derivatives or functionalized noncovalent polymers.

Preferred PamPV polymer derivatives are those where $R_1$ and $R_2$ are alkoxy groups that each contain 8 carbon atoms; $R_3$ is CH and wherein y is from 0 to 6 and the functional groups (FG) are chosen so that $R_4$ is OH (3a), $O(CH_2)_6N_3$ (3b), $O(CH_2)_2OH$ (3c), $O(CH_2)_6OH$ (3d), $O(CH_2)_6NHBoc$ (3e), $OCH_2OMe$ (3f), $O(CH_2)_2Br$ (3h), $O(CH_2)_6Br$ (3i), $O(CH_2)_6SAc$ (3l),

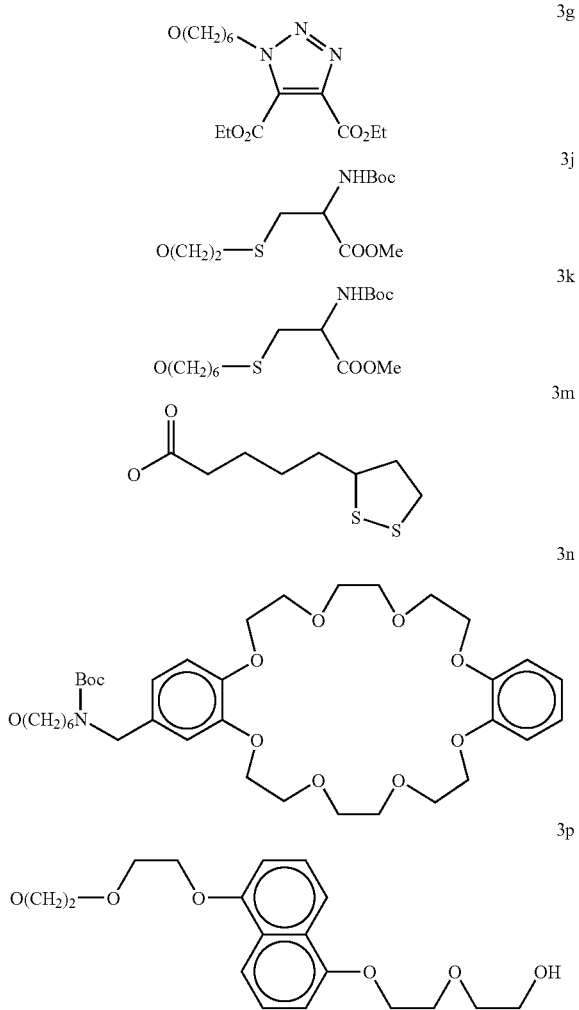

Figure 1:
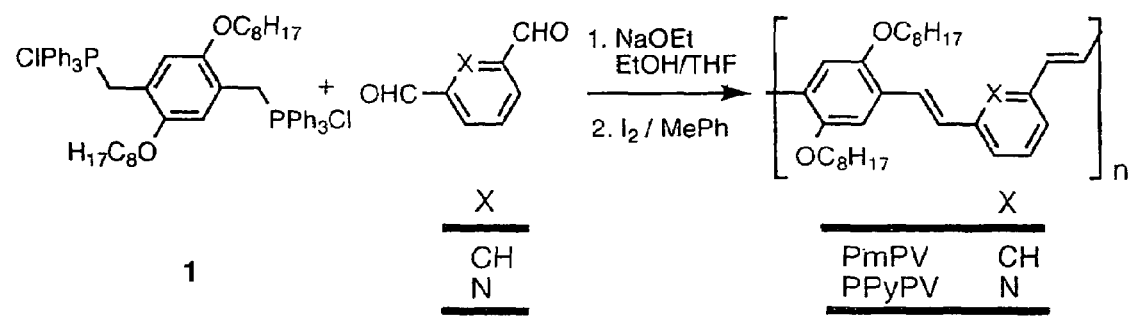
FIG. 1 is a schematic representation of the synthesis of Poly{m-phenylenevinylene)-co-[2,5-dioctyloxy-p-phenylene)vinylene]}, or PmPV (X=CH), Poly{2,6-pyridinylenevinylene)-co-[2,5-dioctyloxy-p-phenylene)vinylene]}, or PpyPV (X=N) by Wittig Polymerization of Diphosphonium Salt 1 from Isophthaldehyde and 2,6-Pyridinedicarbaldehyde, respectively.

Examples of practice are as follows:

Preparation and Characterization of Functional PAmPV Polymers. The polymers carrying functional groups and arms were prepared either (1) by using a functionalized monomer directly or (2) by carrying out subsequent reactions on the polymers. Whereas the first method produces polymers with functional groups present in all the repeating units, the second approach generates randomly substituted polymers where the degree of substitution depends on the efficiencies of the reactions bringing about the modifications. We chose to introduce functionality into the PmPV polymer (X=CH in FIG. 1) at the synthetically accessible C-5 position on the meta-substituted phenylene rings along the polymer backbone.

Figure 2:
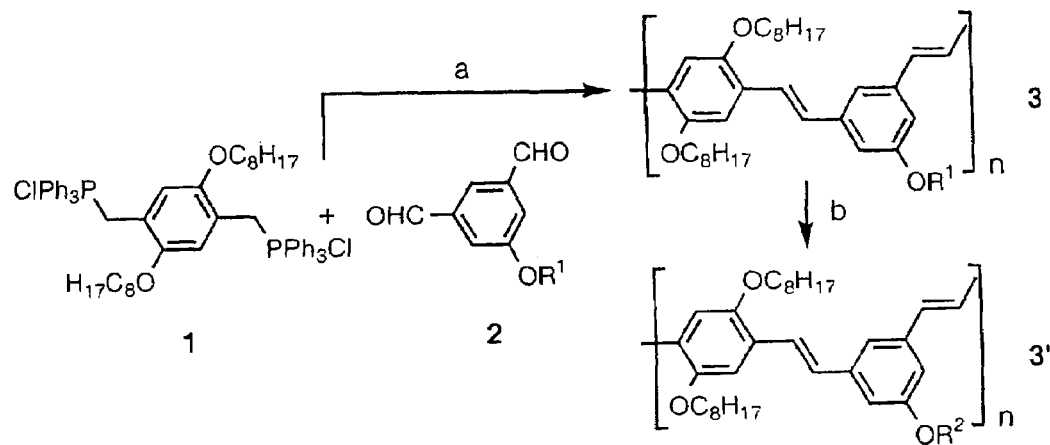
FIG. 2 is a schematic representation of the synthesis of Poly{(5-alkoxy-m-phenylenevinylene)-co-[(2,5-dioctyloxy-p-phenylene)vinylene]}, or PamPV Polymers by (a) Polymerization and (b) Polymer Modification.
Figure 3:
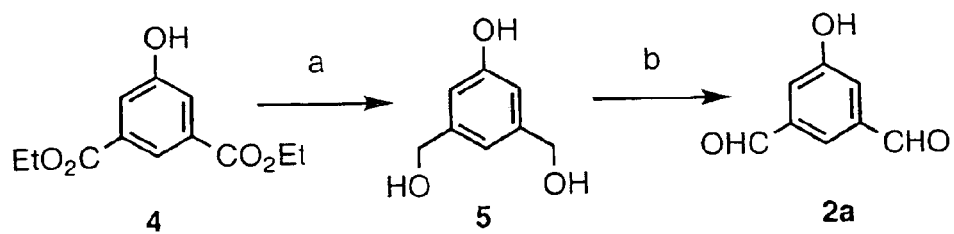
FIG. 3 is a schematic representation of the synthesis of 5-Hydroxyisophthaldehyde (2) using the following reagents and conditions: (a) $LiAlH_4$, THF, reflux, 96%; (b) $K_2Cr_2P_7$; DMSO, 100° C., 35%.
Figure 4:
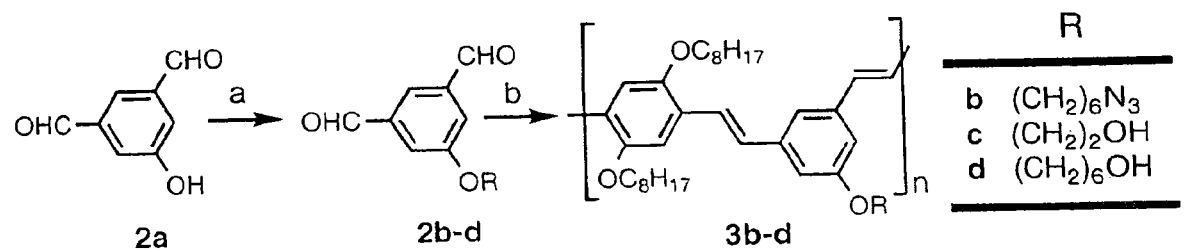
FIG. 4 is a schematic representation of the synthesis of the functional PamPV polymers 3b–d using the following reagents and conditions: (a) R1 or RBr, $K_2CO_3$, DMF, RT, 60–75%; (b) (i) 1, EtONa, EtOH/THF, 60%; (ii) $I_2$ (cat), PhMe, reflux, 100%.
Figure 5:
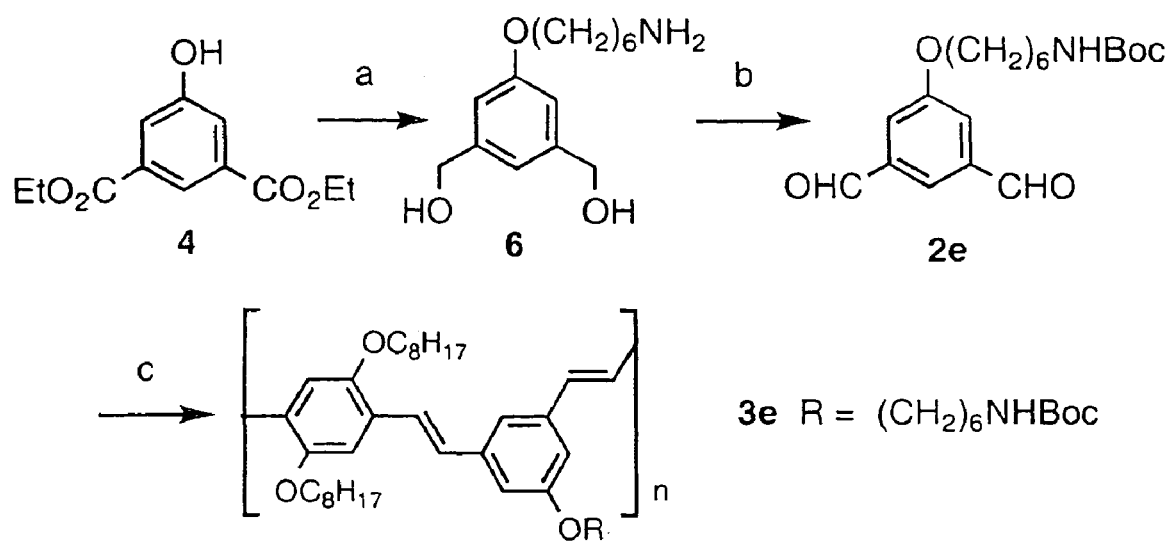
FIG. 5 is a schematic representation of the synthesis of PamPV polymer 3e using the following Reagents and conditions: (a) (i) 6-azido-1-(p-toluenesulfonyloxy)hexane, $K_2CO_3$, DMF, 90%; (ii) $LiAlH_4$, THF, reflux, 61%; (b) (i) $Boc_2O$, $NaHCO_3$, $Na_2CO_3$, 67% (ii) PCC, $CH_2Cl_2$, 60%; (c) (1) 1, EtONa, EtOH/THF, 60%; (ii) $I_2$ (cat), PhMe, reflux, 100%.

The PAmPV polymers 3 were prepared (FIG. 2) from the precursors 2 by a bis-Wittig reaction with the common bisphosphonium salt 1 whose synthesis was described previously.[8] A range of PAmPV polymers 3 have been prepared either (1) by polymerization of the O-substituted 5-hydroxyisophthaldehydes 2 or (2) by modifications of polymers bearing reactive groups at their C-5 positions. 5-Hydroxyisophthaldehyde (2a) was synthesized (FIG. 3) by employing a variation of a published procedure.[10] Starting from the commercially available 5-hydroxydiethylisophthalate (4), reduction (LiAlH$_4$/THF) gave (96%) 3,5-bishydroxymethylphenol (5) which was oxidized, on treatment with a Me$_2$SO solution of potassium dichromate,[11] to afford the key monomer 2a. O-Alkylations of 2a could be performed (FIG. 4) under relatively mild conditions, i.e., K$_2$CO$_3$ in DMF at room temperature using both bromides and iodides as the alkylating agents. Alternatively, O-alkylated 5-hydroxyisophthaldehydes could be obtained by alkylation of 5-hydroxy-diethylisophthalate (4), e.g., the Boc-protected derivative 2e was synthesized (FIG. 5) using this approach: 4 was alkylated with 6-azidotosylhexanol and then the product was reduced—the azide to an amino function and the ester to alcohols—with LiAlH$_4$/THF to afford 6 wherein the amino function was protected with a Boc group prior to its being oxidized (PCC/CH$_2$Cl$_2$) to the functionalized dialdehyde 2e. A range of different O-alkylated 5-hydroxyisophthaldehydes (2b–e), including aliphatic alcohols, azides and protected amines, undergo (FIGS. 4 and 5) bis-Wittig-style polymerizations smoothly. However, the parent phenol 2a did not afford polymers without it first being protected[12] as a methoxymethyl (MOM) ether 2f, which did undergo (FIG. 6) the polymerization to give the polymer 3f, from which the MOM-protecting groups could be readily removed to afford 3a.

The PAmPV polymers were obtained (Table 1A) in yields of 60–80% as a result of reacting the bis-Wittig reagent, generated on treatment of the bisphosphonium salt 1 with NaOEt in ethanolic THF containing the O-substituted 5-hydroxyisophthaldehydes 2b–f. In common with Wittig reactions of this type, the new olefinic bonds materialize as a mixture of cis and trans geometries. However, the cis double bonds can be isomerized to trans ones, giving the all-trans polymers, by heating the crude polymers in PhMe under reflux in the presence of iodine as a catalyst. Although, this step proceeded quantitatively in all cases, one can anticipate a problem when the substituted 5-hydroxyisophthaldehyde monomers react with iodine.[13] Theoretically, such PAmPV polymers could be prepared using the Wittig-Horner reaction which relies on the use of bisphosphonates to produce olefinic bonds with exclusively the all-trans configurations. Indeed, the parent PmPV polymer has been prepared[13,14] with a high degree of polymerization using the Wittig-Horner approach.

TABLE 1A

Selected PamPV polymers (3a–f) prepared by polymerization of O-substituted 5-Hydroxyisophthaldehydes (2a–f)[a]

| Polymer | FW[b] | Yield (%) | M$_n$/PDI | n |
|---|---|---|---|---|
| PmPV[8] | 460.69 | 60 | 11,900/1.6 | 26 |
| 3a[c] | 476.69 | 0 | — | — |
| 3b | 601.86 | 77 | 23,900/1.7 | 40 |
| 3d | 576.85 | 73 | 26,000/1.8 | 45 |
| 3e | 675.98 | 77 | 16,960/1.6 | 25 |
| 3f | 520.74 | 84 | 10,400/1.7 | 20 |

[a]Reagents and Conditions: (i) 1, EtONa, EtOH/THF, 60%, (ii) I$_2$ (cat), PhMe, reflux, 100%. See FIGS. 4–6.
[b]Formula weight of the polymer repeating unit.
[c]No polymerization was observed for the unprotected monomer.

TABLE 1B

Selected PamPV prepared by polymer modifications[a]

| Polymer | FW[b] | Yield (%) | M$_n$/PDI | n |
|---|---|---|---|---|
| 3a | 476.69 | 92 | 8,700/2.2 | 18 |
| 3g | 772.02 | 90 | 21,700/1.6 | 28 |

TABLE 1B-continued

Selected PamPV prepared by polymer modifications[a]

| Polymer | FW[b] | Yield (%) | $M_n$/PDI | n |
|---|---|---|---|---|
| 3i | 639.75 | 94 | 5,900/2.24 | 8 |
| 3l | 634.95 | 95 | 5,500/1.7 | 9 |
| 3m | 665.00 | 93 | 14,000/1.8 | 21 |

Figure 6:
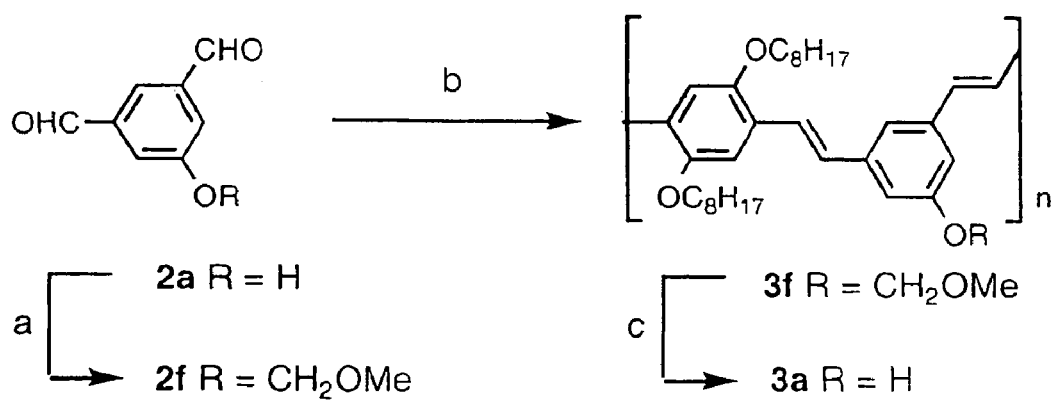
FIG. 6 is a schematic representation of the synthesis of the phenol-containing PamPV Polymer 3a using the following reagents and conditions: (a) $ClCH_2OMe$, $Me_2CO$, $K_2CO_3$, 78%; (b) (i) 1, EtONa, EtOH/THF, 84%; (ii) $I_2$ (cat), PhMe, reflux, 100%; (c) HCl, iPrOH/THF, 92%.
Figure 7:
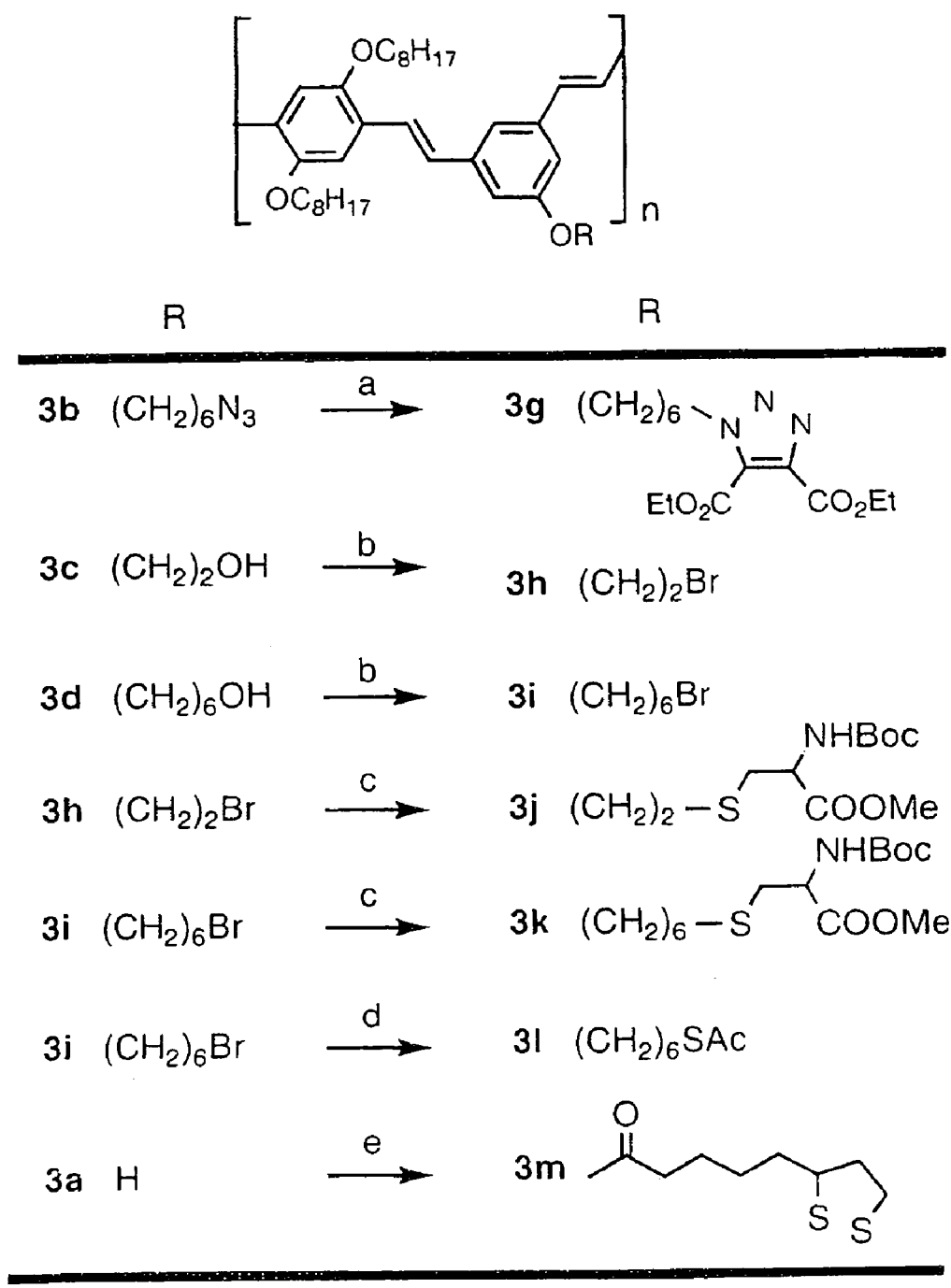
FIG. 7 is a table showing various polymer modifications in accordance with the present invention which were prepared using the following reagents and conditions: (a) diethyl acetylenedicarboxylate, PhMe, reflux, 90% (b) $CBr_4$, $PPh_3$, THF, 0° C.—RT, 92–94%; (c) N-(tert-butoxycarbonyl)-L-cysteine methyl ester, $Et_3N$, $CHCl_3$, RT, 88–91%; (d) thioacetic acid, $Et_3N$, $CHCl_3$, RT, 95%; (e) thioctic acid, DCC, DMAP, $CH_2Cl_2$, RT, 93%.

[a]See FIGS. 6 and 7.
[b]Formula weight of the polymer repeating unit.

TABLE 2

$^1$H NMR (200 MHz) spectroscopic data for the PAmPV polymers (3a–m) in CDCl$_3$

| Polymer | Aromatic Vinyl | OR (separated from —OC$_8$H$_{17}$) | OC$_8$H$_{17}$ |
|---|---|---|---|
| PmPV | 7.64 (s, 1H)<br>7.55–7.46 (m, 4H)<br>7.37 (t, 1H)<br>7.21 (s, 1H)<br>7.16 (s, 3H) | — | 4.09 (t, J = 6.5 Hz, 4H)<br>1.90 (p, J = 6.5 Hz, 4H)<br>1.55 (p, J = 6.5 Hz, 4H)<br>1.42–1.28 (m, 16H)<br>0.87 (t, J = 6.5 Hz, 6H) |
| 3a | 7.53–7.45 (m, 2H)<br>7.15–7.11 (m, 5H)<br>7.01–6.95 (m, 2H) | | 4.07 (brt, 4H)<br>1.92–1.85 (m, 4H)<br>1.59–1.53 (m, 4H)<br>1.43–1.20 (m, 16H)<br>0.85 (brt, 6H) |
| 3b | 7.53 (s, 1H)<br>7.45 (s, 1H)<br>7.19–7.11 (m, 5H)<br>7.01 (s, 2H) | 3.31 (t, J = 6.5 Hz, 2H, —O(CH$_2$)$_5$CH$_2$N$_3$) | 4.08 (brt, 6H)<br>1.88 (brp, 6H)<br>1.70–1.29 (m, 26H)<br>0.86 (brt, 6H) |
| 3c | 7.53 (s, 1H)<br>7.45 (s, 1H)<br>7.19–7.11 (m, 5H)<br>7.03 (s, 2H) | | 4.20–4.02 (m, 8H)<br>1.90 (brp, 4H)<br>1.59–1.54 (m, 4H)<br>1.45–1.25 (m, 16H)<br>0.86 (brt, 6H) |
| 3d | 7.53 (s, 1H)<br>7.45 (s, 1H)<br>7.19–7.11 (m, 5H)<br>7.01 (s, 2H) | 3.70 (t, J = 6.2 Hz, 2H, —O(CH$_2$)$_5$CH$_2$OH) | 4.08 (brt, 6H)<br>1.88 (brp, 6H)<br>1.70–1.29 (m, 26H)<br>0.86 (brt, 6H) |
| 3e | 7.52 (s, 1H)<br>7.46 (s, 1H)<br>7.19–7.11 (m, 5H)<br>6.99 (s, 2H) | 4.52 (b NH 1H)<br>3.12 (brt, 2H, —O(CH$_2$)$_5$CH$_2$NHCO$_2$t-Bu)<br>1.44 (s, 9H, t-Bu) | 4.07 (brt, 6H)<br>1.86 (brp, 6H)<br>1.54–1.28 (m, 26H)<br>0.85 (brt, 6H) |
| 3f | 7.52 (s, 1H)<br>7.44 (s, 1H)<br>7.32 (s, 1H)<br>7.19–7.01 (m, 6H) | 5.25 (s, 2H, OCH$_2$OCH$_3$)<br>3.52 (s, 3H, OCH$_2$OCH$_3$) | 4.06 (brt, 6H)<br>1.88 (brq, 4H)<br>1.59–1.53 (m, 4H)<br>1.46–1.25 (m, 16H)<br>0.83 (brt, 6H) |
| 3g | 7.53 (s, 1H)<br>7.45 (s, 1H)<br>7.19–7.11 (m, 5H)<br>7.01 (s, 2H) | 4.63 (t, J = 7.2 Hz, 2H, —O(CH$_2$)$_5$CH$_2$N<)<br>4.46 (t, J = 7.1 Hz, 2H, —CO$_2$CH$_2$CH$_3$)<br>4.43 (t, 1 = 7.1 Hz, 2H, —CO$_2$CH$_2$CH$_3$)<br>1.41 (t, J = 7.1 Hz, 6H, —CO$_2$CH$_2$CH$_3$) | 4.08 (brt, 6H)<br>1.95–1.84 (m, 6H)<br>1.59–1.25 (m, 26H)<br>0.85 (brt, 6H) |
| 3h | 7.54 (s, 1H)<br>7.46 (s, 1H)<br>7.30 (s, 1H)<br>7.19–7.11 (m, 4H)<br>7.03 (s, 2H) | 4.40 (t, J = 6.2 Hz, 2H, —OCH$_2$CH$_2$Br)<br>3.70 (t, J = 6.2 Hz, 2H, —OCH$_2$CH$_2$Br) | 4.08 (t, J = 6.5 Hz, 4H)<br>2.17 (p, J = 6.5 Hz, 4H)<br>1.59–1.52 (m, 4H)<br>1.45–1.25 (m, 16H)<br>0.86 (brt, 6H) |
| 3i | 7.54 (s, 1H)<br>7.46 (s, 1H)<br>7.19-7.11 (m, 5H)<br>7.01 (s, 2H) | 3.45 (t, J = 6.7 Hz, 2H, —O(CH$_2$)$_5$CH$_2$Br) | 4.08 (brt, 6H)<br>1.88 (brp, 6H)<br>1.70–1.29 (m, 26H)<br>0.86 (brt, 6H) |
| 3j | 7.53 (s, 1H)<br>7.45 (s, 1H)<br>7.19–7.11 (m, 5H)<br>7.00 (s, 2H) | 5.43 (brd, 1H, NH)<br>4.60 (brm, 1H, —SCH$_2$CH<)<br>4.24 (brt, 2H, —OCH$_2$CH$_2$S—)<br>3.77 (s, 3H, —CO$_2$CH$_3$)<br>3.14 (brt, 2H, —SCH$_2$CH<)<br>2.98 (brt, 2H, —OCH$_2$CH$_2$S—)<br>1.45 (s, 9H, t-Bu) | 4.09 (brt, 4H)<br>1.88 (brp, 4H)<br>1.70–1.29 (m, 20H)<br>0.86 (brt, 6H) |
| 3k | 7.53 (s, 1H)<br>7.45 (s, 1H)<br>7.19–7.11 (m, 5H)<br>7.01 (s, 2H) | 5.66 (brd, 1H, NH)<br>4.52 (brm, 1H, —SCH$_2$CH<)<br>3.77 (s, 3H, —CO$_2$CH$_3$)<br>2.95 (brt, 2H, —SCH$_2$CH<) | 4.08 (brt, 6H)<br>1.88 (brp, 6H)<br>1.70–1.29 (m, 26H)<br>0.86 (brt, 6H) |

TABLE 2-continued

¹H NMR (200 MHz) spectroscopic data for the PAmPV polymers (3a–m) in CDCl₃

| Polymer | Aromatic Vinyl | OR (separated from —OC₈H₁₇) | | OC₈H₁₇ |
|---|---|---|---|---|
| 3l | 7.54 (s, 1H)<br>7.45 (s, 1H)<br>7.19–7.11 (m, 5H)<br>7.01 (s, 2H) | 2.56 (brt, 2H, —O(CH₂)₅CH₂S—)<br>1.45 (s, 9H, t-Bu)<br>2.90 (brt, 2H, —O(CH₂)₅CH₂S—)<br>2.33 (s, 3H, SCOCH₃) | | 4.05 (brt, 6H)<br>1.86 (brp, 6H)<br>1.51–1.26 (m, 26H)<br>0.86 (brt, 6H) |
| 3m | 7.52–7.44 (m, 2H)<br>7.32 (s, 1H)<br>7.19–7.01 (m, 6H) | 3.66–3.64 (m, 1H,<br><br>3.20–3.14 (m, 2H,<br><br>2.63 (brt, 2H, —O₂CCH₂—)<br><br>2.54–2.48 (m, 2H, | —CHCH₂CH₂S—<br><br>—CHCH₂CH₂S—<br><br><br>—CHCH₂CH₂S— | ⎤<br>S)<br>⎤<br>S)<br><br><br>⎤<br>S) | 4.07 (brt, 4H)<br>1.90–1.75 (m, 6H)<br>1.59–1.53 (m 6H)<br>1.46–1.25 (m, 20H)<br>0.83 (brt, 6H) |

We carried out a number of different reactions on PmPV derivatives to obtain further chemically modified PAmPV derivatives as shown in FIG. 7. As a general rule, treatment of these derivatives with either strong acid or strong base resulted in insoluble products. For example, attempts (1) to reduce the azido group in polymer 3b and (2) to remove the Boc protecting group from polymer 3e were unsuccessful. Those reactions which could be carried out successfully are summarized in FIG. 7. These reactions were followed by ¹H NMR spectroscopy (see Table 2). Changes in the molecular weights of the polymers were assessed by GPC (Table 1B). Polymer 3b was found to undergo a 1,3-dipolar cycloaddition with diethylacetylenedicarboxylate almost quantitatively to afford polymer 3g. The hydroxymethyl groups in polymers 3c and 3d could be converted easily and efficiently into the corresponding polymers 3h and 3i, respectively, with bromomethyl functions. These bromides react well with good nucleophiles, such as the thiol group in L-cysteine to give, respectively, the polymers 3j and 3k, and thioacetic acid to give the polymer 3l. However, it should be noted that the brominations (CBr₄/Ph₃P) of polymers 3c and 3d are accompanied by losses in molecular weight: see Tables 1A and 1B, which show, for example, that conversion of 3d into 3i is accompanied by a decrease from 45 to 8 in the polymer repeating unit. A more promising approach to polymer modification is the esterification of the phenol-containing polymer 3a, using mild activated-coupling conditions with carboxylic acids, such as thioctic acid where polymer 3m was obtained without any degradation of the polymer chain having occurred (Table 1B). It is worth noting that this polymer could be used to assist in the anchoring of SWNT/PAmPV bundles onto gold surfaces.

Design and Synthesis of Polypseudorotaxanes. The approach used for the grafting of pseudorotaxanes onto PAmPV polymers is to attach neutral recognition units to the C-5 position of 5-hydroxyisophthaldehyde (2a) and then carry out polymerizations with the bis-Wittig reagent derived from the bisphosphonium salt 1. Two pseudorotaxanes were targeted—one involving the tethering of dibenzo[24]crown-8 (DB24C8) macrocycles to the polymer backbone for threading by dibenzylammonium (DBA⁺) ions[15] and the other involving a polyether chain incorporating a 1,5-dioxynaphthalene ring system for encircling by cyclobis (paraquat-p-phenylene).[16]

Figure 8:
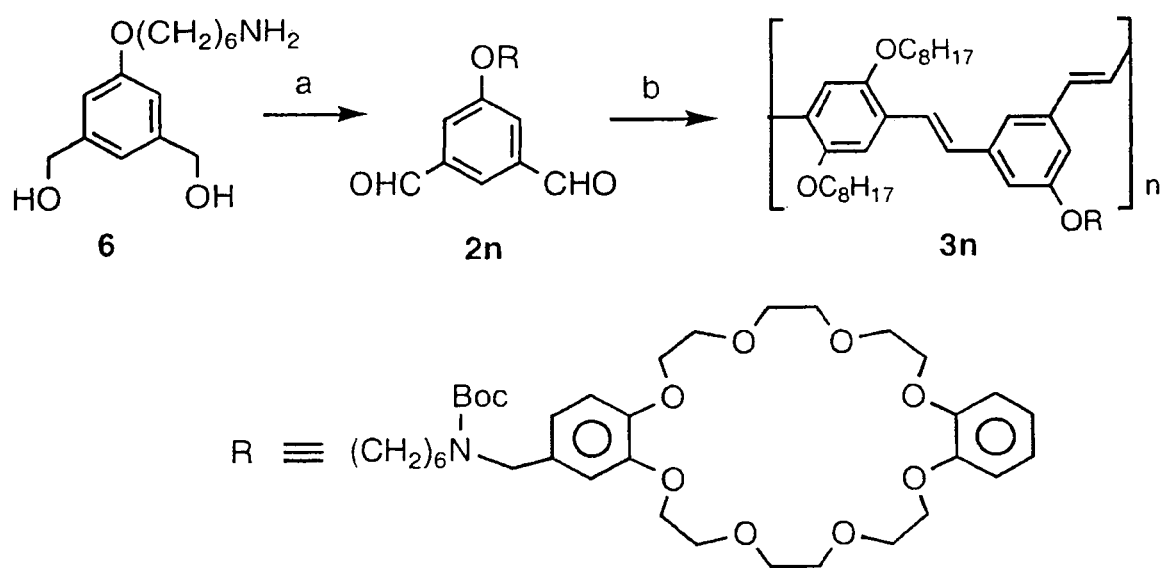
FIG. 8 is a schematic representation of the synthesis of Dibenzo[24]crown-8-containing PamPV polymer 3n using the following reagents and conditions: (a) (i) 2-Formyldibenzo-[24]crown-8, PhMe, reflux; (ii) $NaBH_4$, MeOH; (iii) $Boc_2O$, $NaHCO_3$, $Na_2CO_3$, 67%; (iv) PCC, $CH_2Cl_2$; 60% (b) (i) 1, EtONa, EtOH/THF, 53%; (ii) $I_2$ (cat), PhMe, reflux, 100%.

Since all our initial attempts to introduce crown ether rings onto the side-chains of PAmPV polymers were unsuccessful, we decided to incorporate the DB24C8 appendages into a dialdehyde monomer 2n prior to polymerization (See FIG. 8). The synthesis of the monomer relied upon starting with a formylated DB24C8 derivative[17] which was treated with the amine 6 to produce an imine which was reduced in situ to an amine that was Boc-protected, before being subjected to the polymerization conditions. The molecular weight of the resulting polymer 3n was determined by GPC and found to be 12,300 ($M_n$) with a polydispersity index (PDI) of 1.8. Although the peaks in the ¹H NMR spectrum of the polymer were broadened sufficiently to obscure all the coupling constant information, they could still be assigned unequivocally to protons in the polymer. Significant movement of signals in the region δ3.0–4.6 was evident when DBA.PF₆ was added to the solution of the PAmPV polymer 3n in CDCl₃, indicating the formation of polypseudorotaxanes in the solution.

Figure 9:
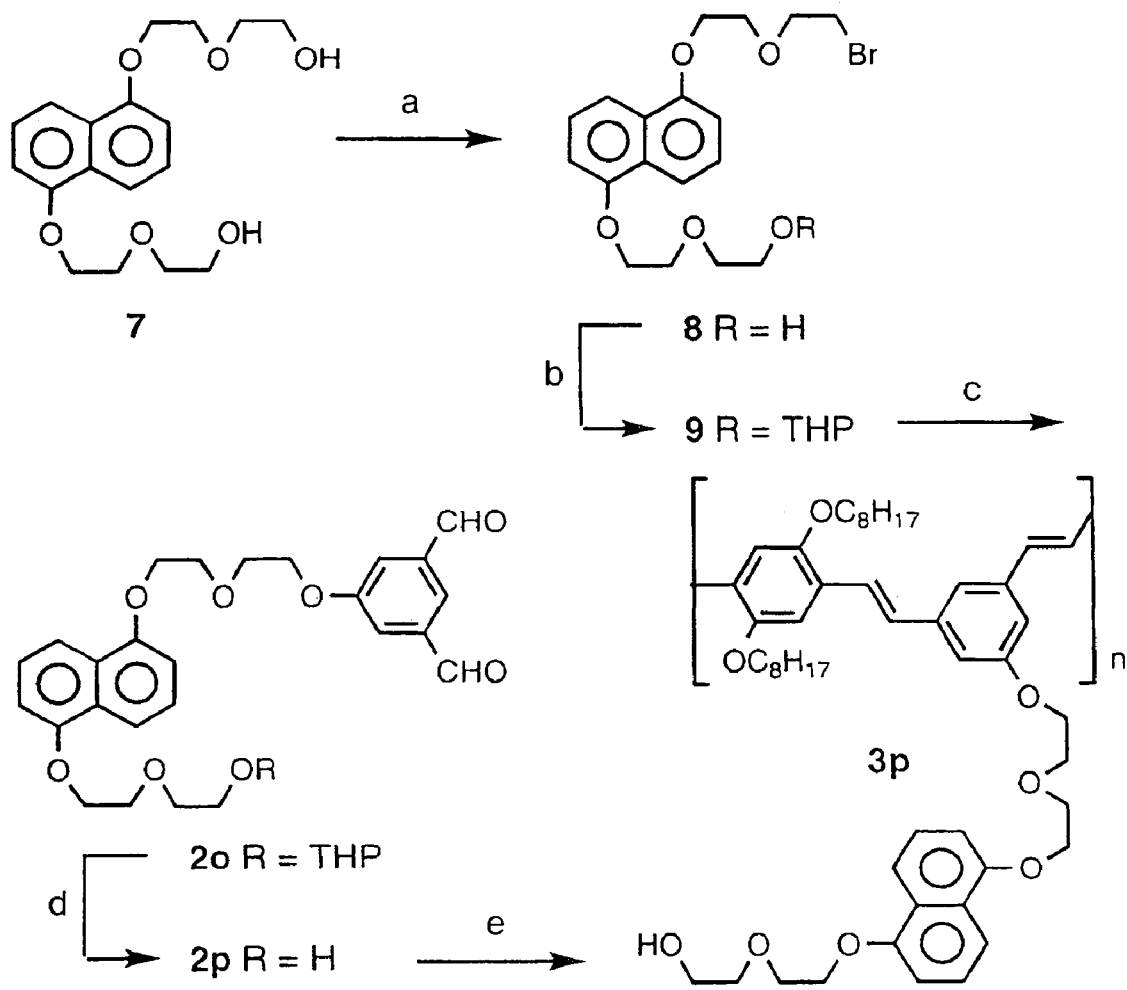
FIG. 9 is a schematic representation of the synthesis of the naphthalene-containing PamPV Polymer 3p using the following reagents and conditions: (a) $PPh_3$, $CBr_4$, THF, 26%; (b) THP, TsOH, $CH_2Cl_2$, 85%; (c) 2a, $K_2CO_3$, DMF, 58%; (d) HCl, THF, 83%; (e) (i) 1, EtONa, EtOH/THF, 53%; (ii) I2 (cat), PhMe, reflux, 100%.

The 1,5-dioxynaphthalene-containing PAmPV polymer 3p was obtained (See FIG. 9) by polymerizing the monomer 2p which was synthesized in four steps from 1,5-dihydroxyethoxyethoxynaphthalene[18] (7). Compound 7 was monobrominated to give 8 which was converted to its THP-protected derivative 9 before being used to alkylate (K₂CO₃/DMF) 5-hydroxyisophthaldehyde (2a) at room temperature. Deprotection of the product 2o yielded the monomer 2p which was subjected to the usual polymerization conditions to give the polymer 3p with $M_n$=14,050, corresponding to a repeating unit of 18. The ¹H NMR spectrum recorded in CDCl₃/CD₃CN was obtained. Upon addition of CBPQT.4PF₆, the polypseudorotaxane is formed: the signals for protons in CBPQT⁴⁺ are broadened and shifted together with those for the 1,5-dioxynaphthalene ring system. The signal broadening is probably related in part to slow complexation-decomplexation of CBPQT⁴⁺ with the side chains tangling from the polymer backbone. UV/VIS spectroscopy also provided further evidence for polypseudorotaxane formation. In common with other PAmPV polymers 3a–3m (see Table 3), polymer 3p absorbs strongly at just above 400 nm. It does not absorb in the 520–540 nm region where the 1,5-dioxynaphthalene/CBPQT$^{4+}$ charge transfer band is expected.[19] However, addition of CBPQT.4PF$_6$ to the polymer solution produces a shoulder centered on 520 nm, indicating the threading of CBPQT$^{4+}$ cyclophanes onto the 1,5-dihydroxynaphthalene containing polyether side-arms on the polymer 3p. This polypseudorotaxane formation can also be detected by the naked eye since the color of the polymer solution changes from greenish-yellow to orange on addition of CBPQT.4PF$_6$.

TABLE 3

UV-VIS Spectroscopic Data of the Selected PamPV Polymers in CHCl$_3$ (average data from $10^{-4}$ and $10^{-5}$ M)

| Polymer | λ max, nm (ε) | |
|---|---|---|
| PmPV | 329 (15,800) | 409 (22,100) |
| 3a | 332 (13,500) | 406 (20,200) |
| 3b | 331 (22,600) | 405 (31,800) |
| 3d | 331 (17,900) | 407 (28,200) |
| 3e | 331 (15,200) | 406 (22,300) |
| 3g | 331 (18,700) | 408 (29,000) |
| 3i | 332 (13,500) | 403 (20,000) |
| 3l | 331 (13,000) | 404 (18,600) |
| 3m | 331 (12,800) | 406 (17,600) |

Interaction of PAmPV Polymers with Single-Walled Carbon Nanotubes (SWNTs). The polymers were tested for their abilities to solubilize bundles of SWNTs. We have shown that the PAmPV derivatives 3a–p form stable solutions with the bundles in CHCl$_3$ and other organic solvents. In the case of the derivative 3a containing phenolic residues, the sodium phenoxide derived polymer was found to solubilize the bundles in protic solvents, e.g., EtOH. Scanning Electron Microscopy (SEM) image of bundles of SWNTs coated with the PAmPV derivative 3a were obtained. Other derivatives, namely 3d, 3e, 3g, 3i, and 3l, afforded similar images, all suggestive of the solubilization of the nanotube bundles in CHCl$_3$. However, in the case of the sodium salt of 3a, EtOH affords an image commensurate with it having solubilized the bundles. SWNTs wrapped with the PAmPV polymer 3a containing reactive phenolic hydroxyl groups were also examined for their ability to react with dicarboxylic acids as cross-linking agents. When the CHCl$_3$ soluble composite was treated with dodecanedioic acid, an insoluble cross-linked resin was formed. The SEM images of this composite resin showed that the SWNT bundles are included in the polymer network.

Although the polypseudorotaxane formed between the PAmPV derivative 3n and DBA.PF$_6$ in CHCl$_3$ can also solubilize SWNTs on sonication, only one minute after sonication is halted the SWNTs start to precipitate out of solution. Presumably, the introduction of positive charges on the side-arms of the polymer decrease the solubility of the polypseudorotaxane composite in CHCl$_3$.

In the case of the PAmPV derivative 3p and CBPQT.4PF$_6$, a solvent mismatch (SWNT bundles wrapped with 3p are soluble in CHCl$_3$ but not in MeCN, whereas CBPQT.4PF$_6$ is soluble in MeCN but not in CHCl$_3$) has prevented us from studying the solubilization of SWNTs with this polypseudorotaxane. Indeed, the polymer-wrapped SWNTs which are soluble in CHCl$_3$ precipitate their SWNTs on addition of an MeCN solution of CBPQT.4PF$_6$. The precipitation may be another example where addition of positive charge to the side-arms of the polymer is the cause or it may simply be a solvent effect.

On account of solvent constraints, the traditional observation of a CT band resulting from the threading of the CBPQT$^{4+}$ by the 1,5-dioxynapthalene-containing polyether side chains on the PAmPV derivative 3p could not be performed in the presence of SWNTs, the reason being that, on the addition of MeCN or Me$_2$CO the SWNTs precipitate from solution. Scanning probe microscopy provides an alternative means to investigate this triply supramolecular bundle. In particular, tapping mode atomic force microscopy (AFM) and surface potential (SP) microscopy were informative. Dilute solutions of the polymer 3p and SWNTs in CHCl$_3$ were spin-coated onto silicon oxide wafers that were pre-patterned with alignment markers. After the supramolecular bundles had been characterized by AFM and SP, the wafers were placed in a 0.1 mM solution of CBPQT.4PF$_6$ in MeCN for 12 hours.[20] Individual bundles were identifiable as a result of their fixed proximity to the alignment markers. A series of AFM images were obtained, starting with the topography of the supramolecular bundle and its corresponding SP. After exposure of the wafer to the MeCN solution of CBPQT.4PF$_6$, while there was no change in the topography, there was a significant change in the SP. It was evident from a comparison of the images that the addition of the CBPQT.4PF$_6$ solution affects the dipole density of the bundle. Although this observation does not prove that CBPQT$^{4+}$ has threaded onto the 3p polymer-coated bundles, we believe that the tetracationic cyclophane has become associated in some way with the bundles.

Figure 10:
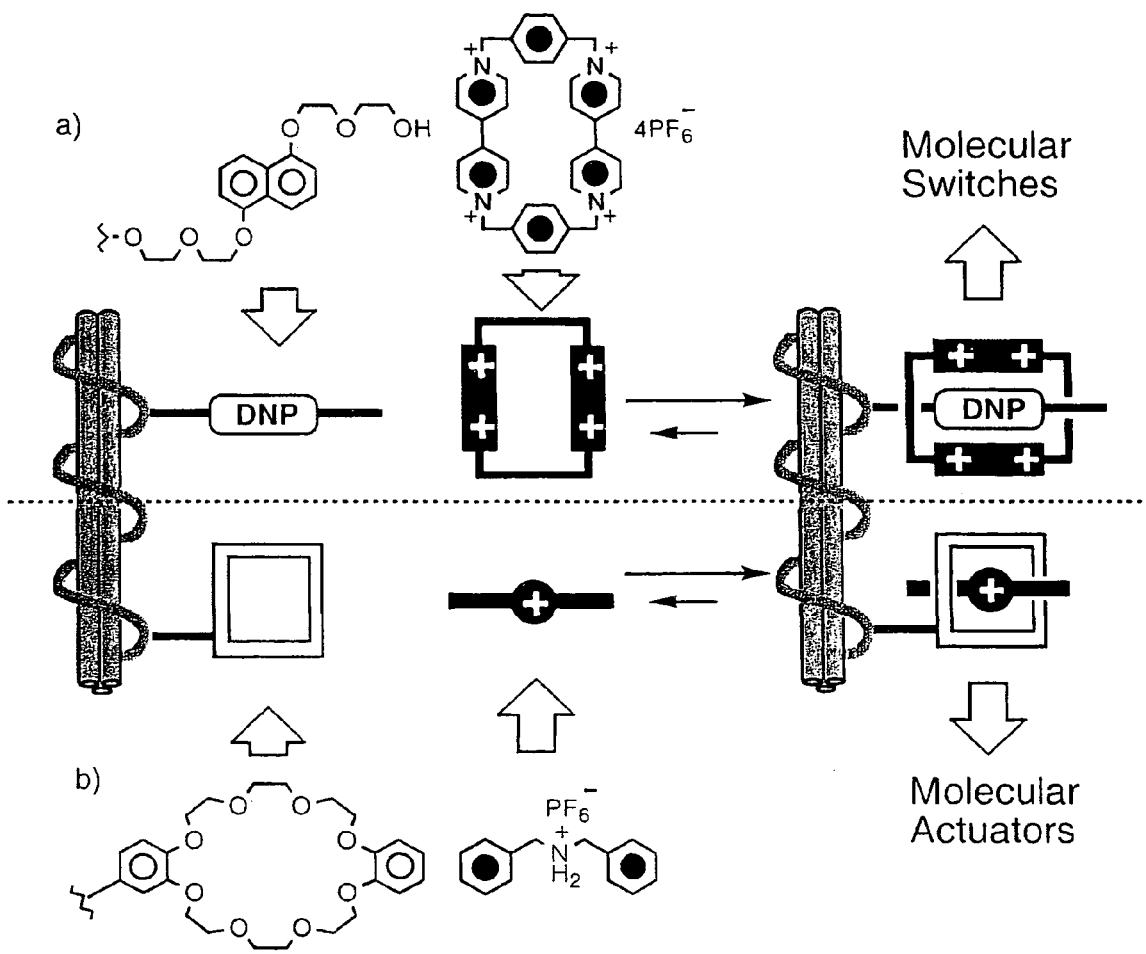
FIG. 10 is a schematic representation of polypseudorotaxane formation from polymers 3n and 3p.

The preceding examples of practice demonstrate that the noncovalent functionalization of bundles of carbon nanotubes with conducting polymers that have the capacity to form pseudorotaxanes represents the operation of supramolecular forces at three different levels of superstructure, viz., (1) the aggregation of the nanotubes into bundles, (2) the wrapping of the bundles by the polymer, and (3) the formation through the side-arms attached to the polymer of threaded complexes. The results demonstrate, as schematically shown in FIG. 10, the prospect of developing arrays of molecular actuators and switches in the future.

Further details of the examples of practice are as follows:

Materials and Instrumentation. Chemicals were purchased from Aldrich and used as received. Syntheses of 2,5-bis(methyltriphenylphosphonium chloride)-1,4-bis(octyloxy)benzene (1) have previously been reported by us.[7] Cyclobis(paraquat-p-phenylene) (CBPQT$^{4+}$) was synthesized according to the literature procedures.[16] Sodium ethoxide was freshly prepared prior to use from Na metal and anhydrous EtOH. Solvents were dried, distilled, and stored under argon. UV/visible spectra were obtained using a Varian Cary 100 Bio spectrophotometer. Absorption measurements of polymeric sample solutions were carried out in CHCl$_3$ with concentrations of $1.0 \times 10^{-4}$ and $1 \times 10^{-5}$ M relative to repeating units in a polymer. Molecular weights of polymers were determined by using a Dynamax solvent delivery module system, Styragel HR3 column, and a Dynamax PDA-2 diode array detector, at a flow rate of 1.0 mL/min. All molecular weights were measured against polystyrene standards in THF. Proton and carbon nuclear magnetic resonance spectra ($^1$H NMR and $^{13}$C NMR) spectra were recorded on a Bruker ARX400 or ARX500 at 25° C., using the deuterated solvent as lock and the residual solvent as internal standard. Elemental analysis was performed by Quantitative Technologies Inc.

General Polymerization Procedure. A solution of NaOEt in EtOH (1 M, 2.5 mL) was added dropwise to a solution of 2,5-dioctyloxy-1,4-bis(triphenylphosphonium) dichloride (1) (1 mmol) and substituted 5-hydroxyisophthaldehyde (2) (1 mmol) in a mixture of anhydrous EtOH (10 mL) and THF (10 mL) at ambient temperature. The reaction mixture was stirred for an additional 24 h and then evaporated to dryness. The residue was dissolved in a minimum amount of $CHCl_3$ (1 mL) and the crude polymer was precipitated out by addition of MeOH (20 mL) as a yellow resin, that was filtered and dried. A sample of the crude polymer (50 mmol) and $I_2$ (0.5 mg) was refluxed in PhMe (15 mL) for 4 h. The solvent was evaporated off under vacuum, and the polymer was precipitated from $CHCl_3$ by the addition of an excess of MeOH. The polymer was filtered and dried to afford PAmPV (3) as a yellow resin. Typical yields are 60–80%. See Table 1.

Following the general polymerization procedure, 3n polymer was obtained from 1 (0.96 g, 1.0 mmol) and 2n (0.81 g, 1 mmol) as a yellow sticky solid (0.74 g, 65%). Data for 3n: $^1H$ NMR (500 MHz, $CDCl_3$): δ=7.52 (s, 1H), 7.42 (s, 1H), 7.19–7.06 (m, 5H), 6.96 (s, 2H), 6.79 (brs, 4H), Ar—H, crown), 6.68 (brd, 3H, Ar—H, crown), 4.33 (brs, 2H, >$NCH_2Ar$), 4.12 (brs, 8H, α-H crown), 4.07–4.03 (m, 6H, —$OCH_2(CH_2)_5$—), 3.90 (brs, 8H, β-H crown), 3.82 (brs, 8H, γ-H crown), 3.19 (brd, 2H, —$O(CH_2)_5CH_2N$<), 1.88–1.85 (m, 6H, —$OCH_2CH_2$—), 1.54–1.28 (m, 6H, —$CH_2$—), 1.45 (s, 9H, t-Bu), 0.85 (brt, 6H, —$O(CH_2)_7CH_3$); $^{13}C$ NMR (100 MHz, $CDCl_3$): δ=160.0, 159.0, 151.17, 148.95, 148.88, 148.0, 139.6, 131.5, 128.9, 127.0, 124.1, 121.4, 113.99, 113.67, 110.8, 79.5, 71.25, 69.93, 69.62, 69.46, 69.34, 67.90, 53.0, 31.85, 29.71, 29.51, 29.44, 29.34, 28.51, 26.76, 26.30, 25.96, 22.67, 14.12; calculated for $C_{68}H_{97}NO_3$ (1136.5): C, 71.86; H, 8.60; N, 1.23; found: C, 71.21; H, 8.61; N, 1.25.

Following the general polymerization procedure, 3p polymer was obtained from 1 (65 mg, 0.07 mmol) and 2n (32 mg, 0.07 mmol) as a yellow resin; yield 52 mg (0.06 mmol, 53%). Data for 3p: $^1H$ NMR (400 MHz, $CDCl_3$): δ=9.97 (s, 0.08H, CHO end groups), 7.91 (d, 1H, J=8.6 Hz, Ar—H, NP), 7.87 (d, 1H, J=8.4 Hz, Ar—H, NP), 7.51–7.44 (m, 1H), 7.37 (t, 1H, $J_{ave}$=8.0 Hz, Ar—H, NP), 7.33 (t, 1H, $J_{ave}$=8.2 Hz, Ar—H, NP), 7.28 (s, 1H), 7.17–7.04 (m, 5H), 6.88 (d, 1H, J=7.6 Hz, Ar—H, NP), 6.83 (d, 1H, J=7.6 Hz, Ar—H, NP), 6.85–6.70 (m, 2H), 4.37 (t, 2H, J=4.6 Hz,—$OCH_2CH_2O$—), 4.29 (t, 4H, J=4.6 Hz, —$OCH_2CH_2O$—), 4.12 (t, 2H, J=4.6 Hz,—$OCH_2CH_2O$—), 4.07 (t, 4H, J=6.0 Hz, —$OCH_2(CH_2)_6CH_3$), 3.99 (t, 4H, J=4.6 Hz, —$OCH_2CH_2O$—), 3.78–3.72 (m, 4H, —$OCH_2CH_2O$—), 2.02 (brs, 1H, —OH), 1.89 (p, 4H, J=6.8 Hz, —$OCH_2CH_2(CH_2)_5CH_3$), 1.54 (p, 4H, J=6.8 Hz, —$O(CH_2)_2CH_2(CH_2)_4CH_3$), 1.38–1.27 (m, 16H, —$O(CH_2)_3(CH_2)_4CH_3$), 0.85 (t, 6H, J=6.8 Hz, —$O(CH_2)_7CH_3$); $^{13}C$ NMR (100 MHz, $CDCl_3$): δ=154.38 (Ar—C, NP), 154.27 (Ar—C, NP), 151.17, 139.6, 128.9, 126.85 (Ar—C, NP), 126.79 (Ar—C, NP), 125.22 (Ar—CH, NP), 125.15 (Ar—CH, NP), 124.1, 114.8, 114.56 (Ar—CH, NP), 114.55 (Ar—CH, NP), 108.7, 105.80 (Ar—CH, NP, 2 overlapping), 72.60 (—$OCH_2CH_2O$—), 70.18 ($OCH_2CH_2O$), 70.10 (—$OCH_2CH_2O$—), 69.78 (—$OCH_2(CH_2)_6CH_3$), 69.61 (—$OCH_2CH_2O$—), 68.02 ($OCH_2CH_2O$—, 2 overlapping), 67.90 (—$OCH_2CH_2O$—), 61.86 (—$OCH_2CH_2O$—), 31.85, 29.51, 29.49, 29.44, 26.27, 22.68, 14.12; calculated for $C_{50}H_{66}O_8$ (795.05): C, 75.53; H, 8.37; found: C, 74.92; H, 8.40.

Molecular Weight Determinations. The molecular weights and polydispersity (PDI) of 3n ($M_w$=22,100; DPI=1.8) and 3p ($M_W$=24,720; PDI=1.76) were determined in THF by using a size-exclusion chromatograph (SEC) equipped with a UV detector. The SEC system was calibrated by using polystyrene standards prior to use. The GPC measurements of 3n show that its number-average molecular weight ($M_n$) is 12,300, corresponding to 11 repeating units. The GPC measurements of 3p show that the number-average molecular weight ($M_n$) is 14,045, corresponding to 18 repeating units. The presence of the aldehyde end-groups is evident from $^1H$ NMR spectroscopy. The degree of polymerization of 3p was estimated as n≈25 by NMR end-group analysis.

Preparation of the SWNT/Polymer Complex. The SWNTs were produced by the HiPco method and used as received from Rice University. SWNTs (0.3 mg) were added to a solution of the polymer in $CHCl_3$ solution (1 mg in 5 mL). Sonication (30 min) in a water bath (Branson model 1510, 40 kHz) gave a stable transparent solution.

Preparation of the SWNT/Polymer Samples prior to Atomic Force Microscopy (AFM). After sonication, one drop of the SWNT/PAmPV solution was placed on a freshly cleaved 1 $cm^2$ mica wafer, which was subsequently washed with 5 drops of $CHCl_3$ while spinning at 750 rpm to wash off excess of the polymer. AFM images were collected in noncontact mode.

Further details regarding the procedures for making 5-hydroxyisophthaldehyde (2a), O-alkylated 5-hydroxyisophthaldehyde (2b–p), and PAmPV polymers (3a–m) are as follows:

Materials and Instrumentation. Chemicals were purchased from Aldrich and used as received. 1,5-Bis(2-(2-(2-hydroxy)ethoxy)ethoxy)naphthalene (7) was synthesized according to a literature procedure.[19] Solvents were dried, distilled, and stored under argon. Column chromatography was performed using Merck silica gel 60. Melting points (mp) were determined on an Electrothermal melting point apparatus and are uncorrected. UV/visible spectra were obtained using a Varian Cary 100 Bio spectrophotometer. Proton and carbon nuclear magnetic resonance spectra ($^1H$-NMR and $^{13}C$-NMR) spectra were recorded on a Bruker AM200 or AM360 or ARX400 at 25° C., using the deuterated solvent as lock and the residual solvent as internal standard. Electron Impact Ionization Mass Spectrometry (EI-MS) was performed on a AUTO-SPEC instrument. Elemental analyses were performed by Quantitive Technologies Inc.

3,5-Bis(hydroxymethyl)phenol (5) was prepared as follows: A solution of dimethyl 5-hydroxyisophthalate (4) (21.0 g, 0.100 mol) in dry THF (300 mL). The mixture was heated under reflux for 2 h and then stirred at ambient temperature overnight. EtOAc (20 mL), EtOH (10 mL), and brine (100 mL) were added dropwise, and the resulting suspension was filtered and washed with EtOH (2×100 mL). The filtrate was evaporated under vacuum to give 5 as a pale-yellow, hydroscopic glass (14.8 g, 96%).

5-Hydorxybenzene-1,3-dicarbaldehyde (2a) was prepared as follows: A mixture of 5 (7.7 g, 50 mmol) and 0.30 M solution if $K_2CrO_7$ (29.4 g) in DMSO (333 mL) was stirred for 4 h at 100° C. After cooling down, $H_2O$ (1.5 L) was added and the product was extracted into $Et_2O$ (5×200 mL), washed with $H_2O$, dried ($Na_2SO_4$), and the solvent was evaporated off to give 2 as a white solid (2.6 g, 35%); mp 146–147.5° C.

5-(6-Azidohexoxy)benzene-1,3-dicarbaldehyde (2b) was prepared as follows: A mixture of 2a (0.60 g, 4.0 mmol), 6-azidohexyl iodide (1.0 g, 5.0 mmol), and $K_2CO_3$ (0.69 g, 5.0 mmol) in DMF (6 mL) was stirred for 24 h at ambient temperature. The mixture was filtered and the solvent was evaporated off. The crude product was dissolved in $CH_2Cl_2$, washed with $H_2O$, dried ($Na_2SO_4$), and the solvent was evaporated off. The pure product 2b was obtained as an oil (0.79 g, 72%) after column chromatography ($SiO_2$: EtOAc/ $CH_2Cl_2$, 1:99).

5-(2-Hydroxyethoxy)benzene-1,3-dicarbaldehyde (2c) was prepared as follows: A mixture of 2a (0.60 g, 4.0 mmol), 2-(2-tetrahydropyranoxy)ethyl bromide (1.05 g, 5.0 mmol) and $K_2CO_3$ (0.69 g, 5.0 mmol) in DMF (6 mL) was stirred for 24 h at ambient temperature. The mixture was filtered and the solvent was evaporated off. The alkylation product was purified by chromatography ($SiO_2$: MeOH/$CH_2Cl_2$, 1:99). The resulting THP-protected derivative was dissolved in THF (10 mL) and hydrochloric acid (2 M, 2mL) was added dropwise. After 16 h at ambient temperature, $H_2O$ was added (50 mL), and the product was extracted into $CH_2Cl_2$ (3×30 mL). The organic extracts were washed with $H_2O$, dried ($Na_2SO_4$), and the solvent was evaporated off. The pure product 2c was obtained as a white solid (0.65 g, 82%) after column chromatography ($SiO_2$: MeOH/$CH_2Cl_2$, 5:95). M.p. 112–113° C.

5-(6-Hydroxyhexoxy)benzene-1,3-dicarbaldehyde (2d) was prepared as follows: A mixture of 2a (0.60 g, 4.0 mmol), 6-(2-tetrahydropyranoxy(hexyl iodide (1.6 g, 5.0 mmol) and $K_2CO_3$ (0.69 g, 5.0 mmol) in DMF (6 mL) was stirred for 24 h at ambient temperature. The mixture was filtered and the solvent was evaporated off. The alkylation product was purified by chromatography ($SiO_2$: MeOH/$CH_2Cl_2$, 1:99). The resulting THP-protected derivative was dissolved in THF (10 mL) and hydrochloric acid (2 M, 2 mL) was added dropwise. After 16 h at ambient temperature, $H_2O$ was added (50 mL), and the product was extracted into $CH_2Cl_2$ (3×30 mL). The organic extracts were washed with $H_2O$, dried ($Na_2SO_4$), and the solvent was evaporated off. The pure product 2d was obtained as a white solid (0.63 g, 63%) after column chromatography ($SiO_2$: MeOH/$CH_2Cl_2$, 5:95). M.p. 79.5–80.5° C.

5-(6-Azidohexoxy)isophthalic Acid Dimethyl Ester was prepared as follows: A mixture of dimethyl 5-hydroxyisophthalate 4 (1.05 g, 5 mmol), 6-azido-1-(p-toluenesulfonyloxy) hexane (1.57 g, 5 mmol) and $K_2CO_3$ (1.38 g, 10 mmol) in DMF (15 mL) was stirred for 17 h at 80° C. After cooling down, $H_2O$ (150 mL) was added and the mixture was extracted with EtOAc, washed with water, dried ($MgSO_4$), and the solvent was evaporated off. The pure title compound was obtained as a colorless oil (1.51 g, 90%) after column chromatography ($SiO_2$: $CH_2Cl_2$).

3,5-Bis(hydroxymethyl)-1-(6-aminohexoxy)benzene (6) was prepared as follows: A solution of 5-(6-azidohexoxy)-isophthalic acid dimethyl ester (0.70 g, 2.09 mmol) in THF (3 mL) was added dropwise into the suspension of $LiAlH_4$ (0.79 g, 20.9 mmol) in THF (25 mL). The reaction mixture was heated under reflux for 5 h. Water was added carefully to decompose excess of $LiAlH_4$. The resulting suspension was filtered, extracted with $CH_2Cl_2$/i-PrOH (3/1), dried ($MgSO_4$) and evaporated to afford a pale yellow oil 6 (0.50 g, 95%).

5-[N-tert-Butoxycarbonyl)-6-aminohexyloxy]isophthaldehyde (2e) was prepared as follows: 3,5-Bis(hydroxymethyl)-6-aminohexyloxyphenol (6) was Boc-protected and finally was oxidized with PCC in $CH_2Cl_2$ to afford 2e as a yellow oil.

5-Methoxymethoxybenzene-1,3-dicarbaldehyde (2f) was prepared as follows: A solution of 5-hydroxyisophthaldehyde (2a) (0.4 g, 2.7 mmol) and $K_2CO_3$ (p.37 g, 2.7 mmol) in $Me_2CO$ (20 mL) was stirred at room temperature for 15 min. The solution was cooled in an ice-water bath and chloromethyl methyl ether (0.22 g, 2.7 mmol) was added drop-wise over 20 min. The reaction was stirred at room temperature for 16 h. After evaporation to one-quarter of its volume, $H_2O$ was added and the product was isolated by extraction with $Et_2O$, washed with brine and dried ($MgSO_4$). Evaporation of the solvent in vacuo gave oil, which was triturated with light petroleum to afford the pure product 2f as a pale-yellow solid (0.35 g, 78%); mp 81–86° C.

2-{9-[3,5-Bis(hydroxymethyl)phenoxy]-3-N-(tert-butoxycarbonyl)azanonyl}dibenzo-[24]-crown-8 was prepared as follows: 3,5-Bis(hydroxymethyl)-1-(6-aminohexoxy) benzene 6 (0.36 g, 1.4 mmol) and 2-formayldibenzo-24-crown-8 (0.67 g, 1.4 mmol) were dissolved in PhMe and heated under reflux for 12 h using a Dean-Stark apparatus. The solvent was removed in vacuo. The reside was dissolved in MeOH (10 mL) and added dropwise into the suspension of $NaBH_4$ (0.26 g, 7.4 mmol) in MeOH (20 mL). The mixture was stirred at ambient temperature for 3 h. The inorganic solid was filtered off and the filtrate was evaporated to give a pale yellow oil. This oil was then dissolved in MeOH (5 mL) and mixed with $NaHCO_3$ solution (1 mL, 0.5 M) and $Na_2CO_3$ solution (1 mL, 0.5 M). $Boc_2O$ was added and the mixture was stirred for 5 h at ambient temperature, and then was extracted with $CH_2Cl_2$, washed with water, dried ($MgSO_4$), and evaporated to give a yellow oil. The title compound was obtained as a colorless oil after column chromatograph ($SiO_2$: MeOH/$CH_2Cl_2$, 1:9) which was contaminated with a small amount of impurity.

2-{9-[3,5-Bis(formyl)phenoxy]-3-N-(tert-butoxycarbonyl)-azanonyl}dibenzo-[24]crown-8 (2n) was prepared as follows: 2-{9[3,5Bis(hydroxymethyl)phenoxy]-3-N-(tert-butoxycarbonyl)-azanonyl}dibenzo-[24]-crown-8 (0.32 g, 0.39 mmol) was dissolved in $CH_2Cl_2$ (5 mL). NaOAc (2.0 g, 24.4 mmol) was added to the mixture and it was stirred overnight at ambient temperature. $Et_2O$ (100 mL) was added to the mixture and the precipitate was filtered off. The filtrate was evaporated and azetroped with hexane to remove pyridine. The solution was evaporated and subjected to column chromatography ($SiO_2$: gradient elution with $CH_2Cl_2$/MeOH, 100:1 to 50:1) to afford the product 2n a colorless sticky oil (0.19 g, 60%).

2-(2-{5-[2-(2-Bromoethoxy)ethoxy]naphthalen-1-yloxy}ethoxy)ethanol (8) was prepared as follows: Method A—$Ph_3P$ (3.15 g, 12 mmol) was added in portions over 25 min to a solution 7 (3.66 g, 10 mmol) and $CBr_4$ (4 g, 12 mmol) in anhydrous THF (30 mL) at room temperature. The reaction mixture was stirred for 3 h, whereupon $Et_2O$ (60 mL) was added to precipitate $Ph_3PO$. The mixture was filtered and the filtrate evaporated in vacuo to give a brown oil. The product was purified by column chromatography ($SiO_2$: gradient elution with $CH_2Cl_2$/EtOAc/MeOH). The second band containing the desired product was collected and concentrated to give 8 as an analytically pure off-white solid; yield: 1.05 g (2.6 mmol, 26%; mp 80° C.).

Method B—p-Toluenesulfonyl chloride (0.35 g, 1.8 mmol) dissolved in anhydrous $CH_2Cl_2$ (50 mL) was added drop-wise to an ice-cooled solution of 7 (0.6 g, 1.8 mmol), $Et_3N$ (0.6 mL, 4 mmol) and 4-dimethylaminopyridine (22 mg, 0.18 mmol) in anhydrous $CH_2Cl_2$ (75 mL). The reaction was stirred for 2 days at room temperature, whereupon it was washed with 2N HCl solution (200 mL). The aqueous phase was extracted with $CH_2Cl_2$ (2×100 mL). The combined organic layers were dried ($MgSO_4$) and concentrated in vacuo. The product mixture was separated by column chromatography ($SiO_2$: gradient elution with $CH_2Cl_2$/EtOAc/MeOH). The first band ($R_f$=0.9; $SiO_2$, EtOAc) containing the ditosylate was collected and concentrated to give the ditosylate of 7 as an analytically pure off-white solid; yield 0.1 g (0.16 mmol, 9%). The second band ($R_f$=0.6;

SiO₂, EtOAc) containing the monotosylate was collected and concentrated to give the monotosylate of 7 as an analytically pure off-white solid; yield 0.37 g (0.75 mmol, 42%); mp 77° C. The third band ($R_f$=0.3; SiO₂, EtOAc) containing starting material was collected and concentrated to give unreacted 7 as an analytically pure off-white solid; yield 0.22 g (0.6 mmol, 36%). A solution of the monotosylate (0.36 g, 0.73 mmol) of 7 and lithium bromide (0.32 gm 3.7 mmol) in Me₂CO (20 mL) was heated under reflux for 18 h. Then the solution was cooled down and evaporated in vacuo. The residue was dissolved in CH₂Cl₂ (50 mL) and H₂O (100 mL). After separation, the aqueous phase was extracted with CH₂Cl₂ (50 mL). The combined organic layers were dried (MgSO₄) and evaporated in vacuo to afford 8 as an analytically pure off-white solid; yield 0.29 g (0.72 mmol, 99%).

2-(2-{5-[2-(2-Bromoethoxy)ethoxy]naphthalen-1-yloxy}ethoxy)tetrahydropyran Bromide (9) was prepared as follows: A solution of 8 (3 g, 7.5 mmol), 3,4-dihydro-2H-pyran (2.5 mL, 27 mmol), and p-toluenesulfonic acid monohydrate (60 mg, cat. amount) in anhydrous CH₂Cl₂ (250 ml) was stirred for 1.5 h at room temperature. The reaction mixture was washed with H₂O (300 mL), saturated aqueous NaHCO₃ (300 mL) and dried (MgSO₄). Evaporation of the solvent in vacuo gave the product 9, which was purified by flash column chromatograph (SiO₂: CH₂Cl₂). Yield: 3.1 g of analytically pure oil (6.4 mmol, 85%).

5-[2-(2-{5-[2-(2-Hydroxyethoxy)ethoxy]naphthalen-1-yloxy}ethoxy)ethoxy]benzene-1,3-dicarbaldehyde (2p) was prepared as follows: A solution of 5-hydroxybenzene-1,3-dicarbaldehyde (2a) (0.5 g, 3.3 mmol) and K₂CO₃ (5 g, 36 mmol) in anhydrous DMF (20 mL) was added dropwise to the resulting yellow-orange solution. The reaction was stirred for 5 days at room temperature, whereupon it was filtered and the solvent was evaporated in vacuo. The alkylated product was purified by column chromatography (SiO₂: CH₂Cl₂/EtOAc gradient elution). The desired product was collected and concentrated to give 2o as an analytically pure yellow solid; yield: 1.06 g (1.9 mmol, 58%). The THP-protected derivative (20) (0.27 g, 0.5 mmol) was dissolved in THF (20 mL) and HCl (2M, 4 mL) was added dropwise. After 7 days at ambient temperature, H₂O (100 mL) was added and the product was extracted into CH₂Cl₂ (4×50 mL). The organic extracts were dried (MgSO₄) and evaporated in vacuo. The product mixture was purified by column chromatography (SiO2: CH₂Cl₂/EtOAc, 5:1). The product was collected and concentrated to give 2p as an analytically pure white solid; yield 0.19 g (0.4 mmol, 83%); mp 92° C.

General Polymerization Procedure: A solution of NaOEt in EtOH (1 M, 2.5 mL) was added dropwise to a solution of 2,5-dioctoxy-1,4-bis(triphenylphosphonium) dichloride (1) (1 mmol) and substituted 5-hydroxyisophthaldehyde (2) (1 mmol) in a mixture of anhydrous EtOH (10 mL) and THF (10 mL) at ambient temperature. The reaction mixture was stirred for an additional 24 h and then evaporated to dryness. The residue was dissolved in a minimum amount of CHCl₃ (1 mL) and the crude polymer was precipitated out by addition of MeOH (20 ml) as a yellow resin that was filtered and dried. Yield 75–80%. A sample of the crude polymer (50 mmol) and I₂ (0.5 mg) was refluxed in PhMe (15 mL) for 4 h. The solvent was evaporated off under vacuum, and the polymer was precipitated from chloroform by the addition of an excess of MeOH. The polymer was filtered and dried to afford PamPV (3) as a yellow resin. Yield 90–95%.

The following polymers were obtained using the general polymerization procedure as follows:
  3b was obtained from 2b as a yellow resin (463 mg, 77%).
  3c was obtained from 2c as a yellow resin (390 mg, 75%).
  3d was obtained from 2d as a yellow resin (478 mg, 73%).
  3e was obtained from 2e as a yellow resin (519 mg, 77%).
  3f was obtained from 2f (43 mg, 0.22 mmol) as a yellow resin (96 mg, 84%).

Polymer 3a was obtained as follows: PamPV 3f (90 mg, 0.17 mmol) was dissolved in a mixture of THF (8 mL) and i-PrOH (5 mL), then concentrated HCl (0.1 mL) was added and the solution was stirred at room temperature for 5 days. After evaporation in vacuo, the resulting polymer was washed with MeOH and dried to afford 3a as a yellow resin (81 mg, 92%).

Polymer 3g was obtained as follows: A mixture of Pam PV 3b (126 mg. 0.20 mmol equivalents of azido groups) and diethyl acetylenedicarboxylate (170 mg, 1.0 mmol) was refluxed in PhMe (6 mL) for 6 h. The solvent was evaporated off and the polymer was precipitated from CHCl₃ by the addition of an excess of MeOH. The polymer was filtered, washed with MeOH, and dried, to afford PamPV 3g as a yellow resin (138 mg, 90%).

Polymer 3h was obtained as follows: PPh₃ (393 mg, 1.5 mmol) was added in portions to a stirred mixture of the Pam PV 3c (156 mg, 0.30 mmol equivalents of the hydroxyl groups) and CBr₄ (497 mg, 1.5 mmol) in dry THF (8 mL) at 0° C. The mixture was stirred for 1 h at 0° C. and then an additional 2 h at ambient temperature. The solvent was evaporated, and the polymer was precipitated from CHCl₃ by addition of an excess of MeOH. The polymer was filtered, washed with MeOH, and dried, to afford PamPV 3h as a yellow resin (161 mg, 92%).

Polymer 3i was prepared as follows: PPh₃ (393 mg, 1.5 mmol) was added in portions to a stirred mixture of the PamPV 3d (173 mg, 0.30 mmol equivalents of hydroxyl groups) and CBr₄ (497 mg, 1.5 mmol) in dry THF (8 mL) at 0° C. The mixture was stirred for 1 h at 0° C. and the 2 h more at ambient temperature. The solvent was evaporated off, and the polymer was precipitated from CHCl₃ by the addition of an excess of MeOH. The polymer was filtered, washed with MeOH and dried to afford PamPV 3i as a yellow resin (181 mg, 94%).

Polymer 3j was prepared as follows: A mixture of a PamPV 3h (117 mg, 0.20 mmol equivalent of the bromo-group), N-(tert-butoxycarbonyl)-L-cysteine methyl ester (235 mg, 1.0 mmol), and Et₃N (101 mg, 1.0 mmol) in CHCl₃ (6 mL) was stirred for 20 h at ambient temperature. The solution was concentrated, and the polymer was precipitated by the addition of an excess of MeOH. The polymer was filtered, washed with MeOH and dried to afford PamPV 3j as a yellow resin (134 mg, 91%).

Polymer 3k was prepared as follows: A mixture of a PamPV 3i (128 mg, 0.20 mmol equivalents of the bromo groups), N-(tert-butoxycarbonyl)-L_cysteine methyl ester (235 mg, 1.0 mmol), and Et₃N (101 mg, 1.0 mmol) in CHCl₃ (6 mL) was stirred for 20 h at ambient temperature. The solution was concentrated, and polymer was precipitated by addition of an excess of MeOH. The polymer was filtered, washed with MeOH and dried to afford PamPV 3k as a yellow resin (140 mg, 88%).

Polymer 3l was prepared as follows: A mixture of PamPV 3i (62 mg, 0.10 mmol equivalents of hydroxy groups), thioacetic acid (38 mg, 0.50 mmol), and triethylamine (51 mg, 0.50 mmol) was stirred in CHCl₃ (3 mL) at room temperature for 6 h. The solvent was evaporated off, and the polymer was precipitated from CHCl₃ by the addition of an excess of MeOH. The polymer was filtered, washed with MeOH, and dried to afford 3l as a yellow resin (59 mg, 95%).

Polymer 3m was prepared as follows: A mixture of PamPV 3a (12 mg, 0.025 mmol), thioctic acid (8 mg, 0.04 mmol), DCC (16 mg, 0.08 mmol), and DMAP (3 mg, 0.025 mmol) was stirred in dry $CH_2Cl_2$ (4 mL) at room temperature for 18 h. The solvent was evaporated off, and the polymer was washed with MeOH, dried to afford 3m as a yellow resin (15 mg, 93%).

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

BIBLIOGRAPHY (1) (a) Ajayan, P. M. *Chem. Rev.* 1999, 99, 1787–1799. b) Ajayan, P. M.; Zhou, O. Z. In *Carbon Nanotubes*; Dresselhaus, M. S.; Dresselhaus, G.; Avouris, Ph., Eds., *Top. Appl. Phys.* 2001, 80, 391–425.
(2) Hirsch, A. *Angew. Chem., Int. Ed.* 2002, 41, 1853–1859.
(3) Bahr, J. L.; Yang, J.; Kosynkin, D. V.; Bronikowski, M. J.; Smalley, R. E.; Tour, J. M. *J. Am. Chem. Soc.* 2001, 123, 6536–6542.
(4) (a) Holzinger, M.; Vostrowsky, O.; Hirsch, A.; Hennrich, F.; Kappes, M.; Weiss, R.; Jellen, F. *Angew. Chem., Int. Ed.* 2001, 40, 4002–4005. (b) Georgakilas, V.; Kordatos, K.; Prato, M.; Guldi, D. M.; Holzinger, M.; Hirsch, A. *J. Am. Chem. Soc.* 2002, 124, 760–761.
(5) (a) Curran, S. A.; Ajayan, P. M.; Blau, W. J.; Carroll, D. L.; Coleman, J. N.; Dalton, A. B.; Davey, A. P.; Drury, A.; McCarthy, B.; Maier, S.; Strevens, A. *Adv. Mater.* 1998, 10, 1091–1093. (b) Curran, S.; Davey, A. P.; Coleman, J. N.; Dalton, A. B.; McCarthy, B.; Maier, S.; Drury, A.; Gray, D.; Brennan, M.; Ryder, K.; Lamy de la Chapelle, M.; Journet, C.; Bernier, P.; Byrne, H. J.; Carroll, D.; Ajayan, P. M.; Lefrant, S.; Blau, W. *Synth. Met.* 1999, 103, 2559–2562. (c) Coleman, J. N.; Dalton, A. B.; Curran, S.; Rubio, A.; Davey, A. P.; Drury, A.; McCarthy, B.; Lahr, B.; Ajayan, P. M.; Roth, S.; Barklie, R. C.; Blau W. J. *Adv. Mater.* 2000, 12, 213–216. (d) McCarthy, B.; Coleman, J. N.; Czerw, R.; Dalton, A. B.; Carroll, D. L.; Blau, W. J. *Synth. Met.* 2001, 121, 1225–1226.
(6) (a) Dalton, A. B.; Stephan, C.; Coleman, J. N.; McCarthy, B.; Ajayan, P. M.; Lefrant, S.; Bernier, P.; Blau, W. J.; Byrne H. J. *J. Phys. Chem. B* 2000; 104, 10012–10016. (b) Chen, J.; Liu, H.; Weimer, W. A. Halls, M. D.; Waldeck, D. H.; Walker, G. C. *J. Am. Chem. Soc.* 2002, in press.
(7) Star, A., Stoddart, J. F.; Steuerman, D.; Diehl, M., Boukai; A., Wong; E. W., Yang, X.; Chung, S. W.; Choi, H.; Heath, J. R. *Angew. Chem., Int. Ed.* 2001, 40, 1721–1725.
(8) Steuerman, D. W.; Star, A.; Narizzano, R.; Choi, H.; Ries, R. S.; Nicolini, C.; Stoddart, J. F.; Heath, J. R. *J. Phys. Chem. B* 2002, 106, 3124–3130.
(9) Amabilino, D. B.; Stoddart, J. F. *Chem. Rev.* 1995, 95, 2725–2828.
(10) Provent, C., Chautemps, P.; Gellon, G.; Pierre, J.-L. *Tetrahedron Lett.* 1996, 37, 1393–1396.
(11) Santaniello, E.; Ferraboschi, P. *Synthesis* 1980, 646–647.
(12) Süsse, M.; Johne, S.; Hesse, M. *Helv. Chim. Acta* 1992, 75, 457–470.
(13) Braunschweig, A.; Star, A.; Stoddart, J. F. unpublished results.
(14) Davey, A. P.; Drury, A.; Maier, S.; Byrne, H. J.; Blau, W. J. *Synth. Met.* 1999, 103, 2478–2479.
(15) Cantrill, S. J.; Pease, A. R.; Stoddart, J. F. *J. Chem. Soc., Dalton Trans.* 2000, 3715–3734.
(16) Asakawa, M.; Dehaen, W.; L'abbé, G.; Menzer, S.; Nouwen, J.; Raymo, F. M.; Stoddart, J. F.; Williams, D. J. *J. Org. Chem.* 1996, 61, 9591–9595.
(17) Ashton, P. R.; Ba. J.; Fyfe, M. C. T.; Glink, P. T.; Stoddart, J. F.; White, A. J. P.; Williams, D. J. *Angew. Chem xter,* I.; Cantrill, S. *Int. Ed.* 1998, 37, 1294–1296.
(18) Brown, C. L.; Philip, D.; Spencer, N.; Stoddart, J. F. *Israel J Chem.* 1992, 32, 61–67.
(19) (a) Ashton, P. R.; Ballardini, R.; Balzani, V.; Credi, A.; Gandolfi, M. T.; Menzer, S.; Pérez-Garcia, L.; Prodi, L.; Stoddart, J. F.; Venturi, M.; White, A. J. P.; Williams, D. J. *J. Am. Chem. Soc.* 1995, 117, 11171–11197. (b) Ashton, P. R.; Ballardini, R.; Balzani, V.; Boyd, S. E.; Credi, A.; Gandolfi, M. T.; Gómez-López, M.; Iqbal, S.; Philp, D.; Preece, J. A.; Prodi, L.; Ricketts, H. G.; Stoddart, J. F.; Tolley, M. S.; Venturi, M.; White, A. J. P.; Williams, D. J. *Chem. Eur. J.* 1997, 3, 152–170.
(20) The AFM and SP images were taken with a Digital Instruments MultiMode system with a high resolution scanner and MESP tips from Veeco Metrology. The SP images were obtained with a lift height of 40 nm and a drive amplitude of 4000 mV. As a control the nanotube polymer bundles were also measured before and after an exposure to MeCN and no change was recorded.
(21) This compound has been reported previously. See Jeppesen, J. O. Ph.D. Thesis, Odense University, Denmark, 2001.

What is claimed is:

1. A composition of matter comprising a polymer having the formula:

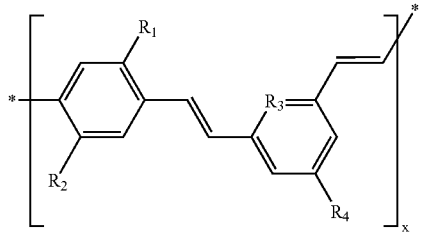

wherein x is from 5 to 100; $R_1$ is a linear or branched alkyl group having from 1 to 19 carbon atoms or a linear or branched alkoxy group having from 1 to 19 carbon atoms; $R_2$ is a linear or branched alkyl group having from 1 to 19 carbon atoms or a linear or branched alkoxy group having from 1 to 19 carbon atoms wherein $R_1$ and $R_2$ may be the same or different; $R_3$ is CH or N; and $R_4$ is $O(CH_2)y$-FG where y is 0 to 20 and FG is a functional group selected from the group consisting of H, F, Cl, Br, OH, SH, $NH_2$, $CO_2H$, amino acids, sugars, DNA fragments, steroids, $CO_2R$ and CONHR, where R is an alkyl group; and nanotubes, wherein said nanotubes are functionalized by said polymer.

2. A composition of matter according to claim 1, wherein both $R_1$ and $R_2$ are alkoxy groups that each contain 8 carbon atoms and wherein $R_3$ is CH.

3. A composition of matter according to claim 1, wherein y is from 0 to 6 and FG is selected from the group consisting of H, $N_3$, OH, NHBoc, OMe, Br, SAc,

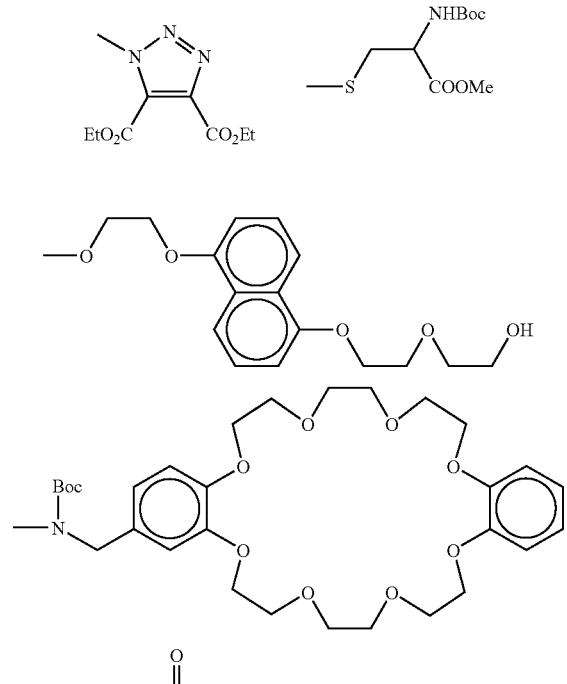

4. A composition of matter according to claim 2, wherein y is from 0 to 6 and FG is selected from the group consisting of H, $N_3$, OH, NHBoc, OMe, Br, SAc,

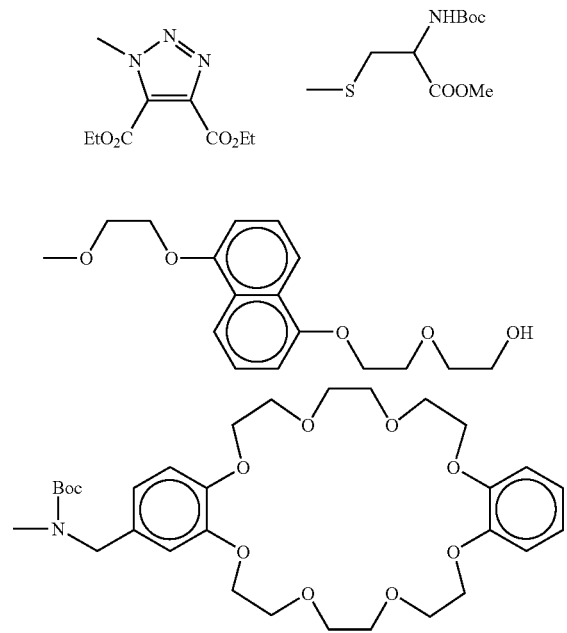

-continued

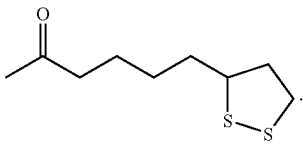

5. A composition of matter according to claim 3 wherein $R_4$ is OH, $O(CH_2)_6N_3$, $O(CH_2)_2OH$, $O(CH_2)_6OH$, $O(CH_2)_6$ NHBoc, $OCH_2OMe$, $O(CH_2)_2Br$, $O(CH_2)_6Br$, $O(CH_2)_6$ SAc,

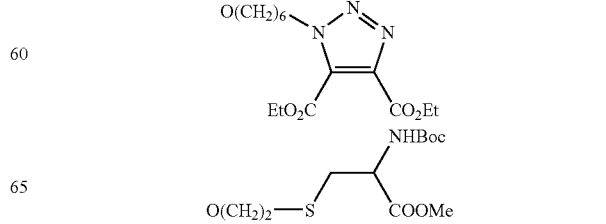

6. A composition of matter according to claim 4, wherein $R_4$ is OH, $O(CH_2)_6N_3$, $O(CH_2)_2OH$, $O(CH_2)_6OH$, $O(CH_2)_6$ NHBoc, $OCH_2OMe$, $O(CH_2)_2Br$, $O(CH_2)_6Br$, $O(CH_2)_6Sac$

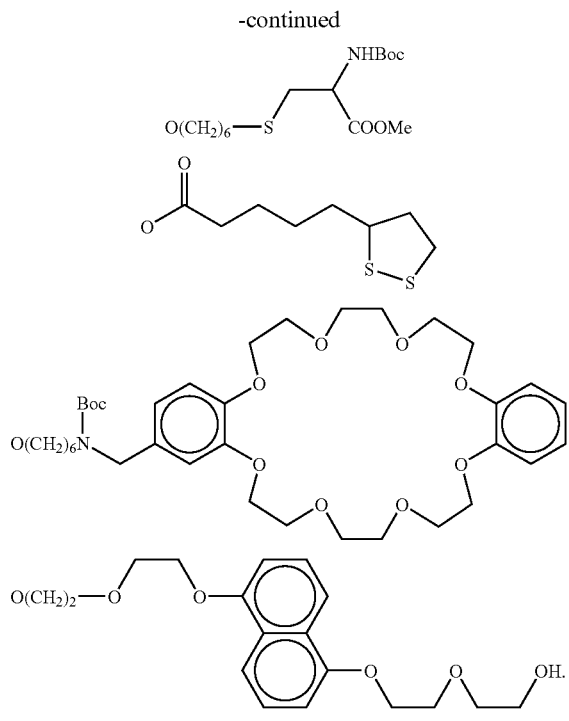

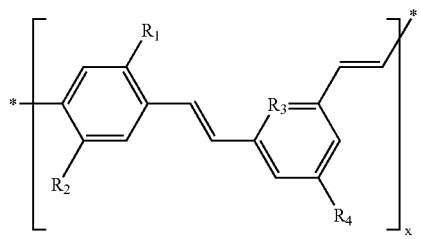

7. A method of making a functionalized nanotube, said method comprising the steps of:

providing a polymer having the formula;

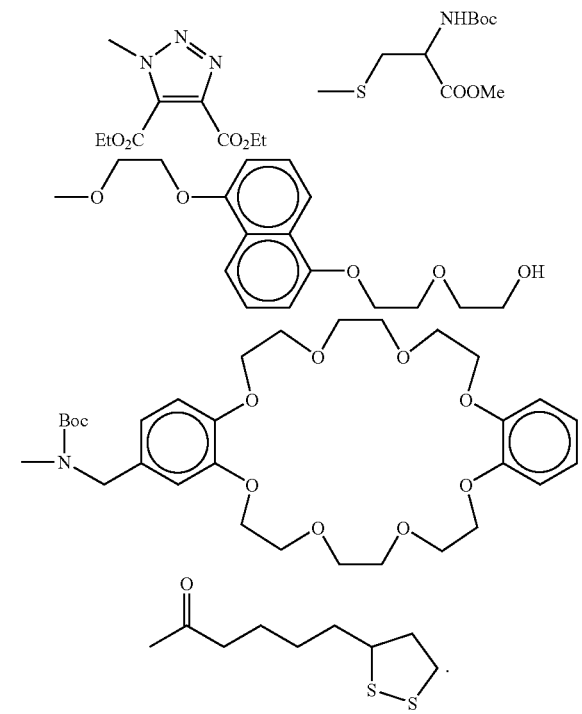

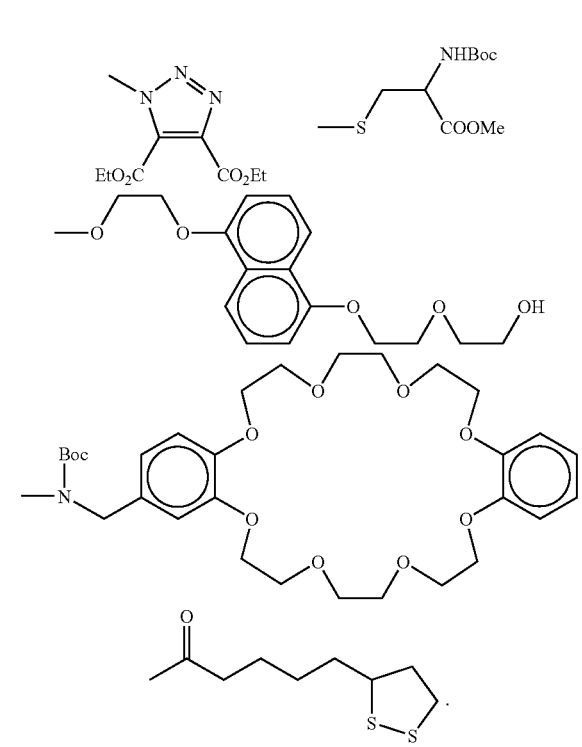

wherein x is from 5 to 100; $R_1$ is a linear or branched alkyl group having from 1 to 19 carbon atoms or a linear or branched alkoxy group having from 1 to 19 carbon atoms; $R_2$ is a linear or branched alkyl group having from 1 to 19 carbon atoms or a linear or branched alkoxy group having from 1 to 19 carbon atoms wherein $R_1$ and $R_2$ may be the same or different; $R_3$ is CH or N; and $R_4$ is $O(CH_2)y$-FG where y is 0 to 20 and FG is a functional group selected from the group consisting of H, F, Cl, Br, OH, SH, $NH_2$, $CO_2H$, amino acids, sugars, DNA fragments, steroids, $CO_2R$ and CONHR, where R is an alkyl group; and combining said polymer with one or more nanotubes to provide said functionalized nanotube.

8. A method according to claim 7 wherein both $R_1$ and $R_2$ are alkoxy groups that each contain 8 carbon atoms and wherein $R_3$ is CH.

9. A method according to claim 7 wherein y is from 0 to 6 and FG is selected from the group consisting of H, $N_3$, OH, NHBoc, OMe, Br, SAc, 10. A method according to claim 8 wherein y is from 0 to 6 and FG is selected from the group consisting of H, $N_3$, OH, NHBoc, OMe, Br, SAc, 11. A method according to claim 9 wherein $R_4$ is OH, $O(CH_2)_6N_3$, $O(CH_2)_2OH$, $O(CH_2)_6OH$, $O(CH_2)_6NHBoc$, $OCH_2OMe$, $O(CH_2)_2Br$, $O(CH_2)_6Br$, $O(CH_2)_6SAc$,

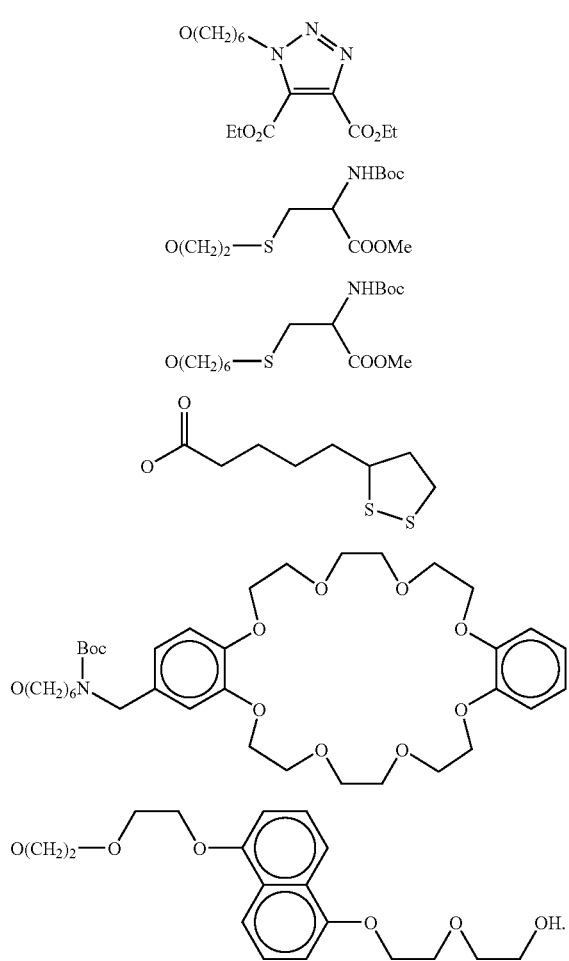

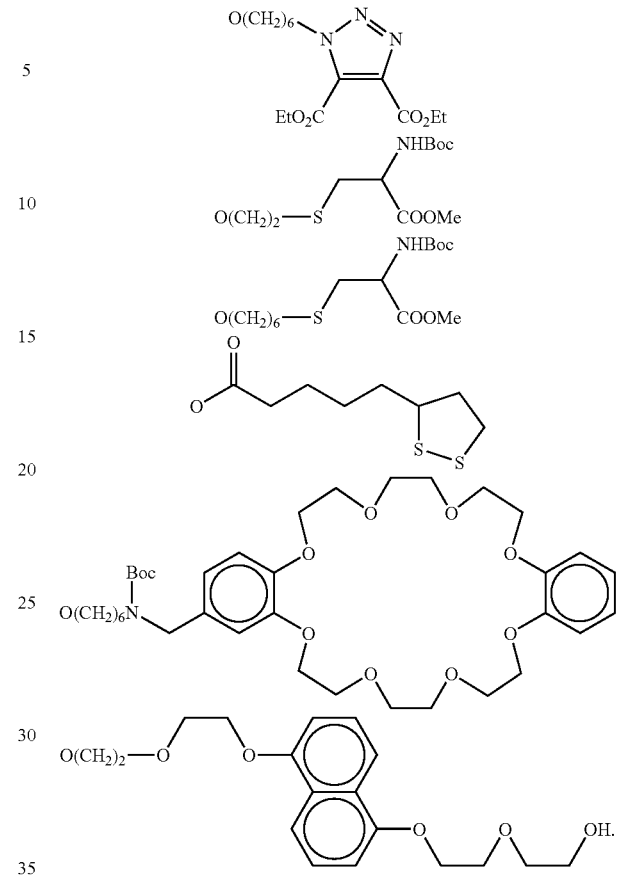

12. A method according to claim 10 wherein $R_4$ is OH, $O(CH_2)_6N_3$, $O(CH_2)_2OH$, $O(CH_2)_6OH$, $O(CH_2)_6NHBoc$, $OCH_2OMe$, $O(CH_2)_2Br$, $O(CH_2)_6Br$, $O(CH_2)_6SAc$,

13. A method according to claim 7 which includes the additional step of combining said functionalized nanotube with a solvent for said nanotube.

14. A method according to claim 8 which includes the additional step of combining said functionalized nanotube with a solvent for said nanotube.

* * * * *